United States Patent [19]

Okada et al.

[11] Patent Number: 5,623,278

[45] Date of Patent: Apr. 22, 1997

[54] DRIVE CIRCUIT FOR A DISPLAY APPARATUS

[75] Inventors: Hisao Okada, Ikoma-gun; Shigeyuki Uehira, Kashihara; Katumi Miki, Inukami-gun; Kuniaki Tanaka; Toshihiro Yanagi, both of Nara, all of Japan

[73] Assignee: Sharp Kabushiki Kaisha, Osaka, Japan

[21] Appl. No.: 416,645

[22] Filed: Apr. 5, 1995

Related U.S. Application Data

[62] Division of Ser. No. 316,821, Oct. 3, 1994, which is a continuation of Ser. No. 768,051, Sep. 27, 1991, abandoned.

[30] Foreign Application Priority Data

| Sep. 28, 1990 | [JP] | Japan | 2-261471 |
| Sep. 28, 1990 | [JP] | Japan | 2-261478 |
| Sep. 28, 1990 | [JP] | Japan | 2-261483 |
| Oct. 1, 1990 | [JP] | Japan | 2-264576 |

[51] Int. Cl.⁶ .................................................. G09G 3/36
[52] U.S. Cl. .............................. 345/95; 345/99; 345/210
[58] Field of Search ............................ 345/87, 95, 99, 345/147, 89, 94, 210

[56] References Cited

U.S. PATENT DOCUMENTS

| 4,739,312 | 4/1988 | Oudshoorn et al. | 345/147 |
| 4,748,444 | 5/1988 | Arai | 340/784 |
| 4,775,891 | 10/1988 | Aoki et al. | 358/160 |
| 4,921,334 | 5/1990 | Akodes | 350/333 |
| 5,091,722 | 2/1992 | Kitajima et al. | 345/89 |
| 5,196,738 | 3/1993 | Takahara et al. | 307/296.1 |
| 5,200,741 | 4/1993 | Usui | 345/210 |
| 5,365,284 | 11/1994 | Matsumoto et al. | 345/99 |

FOREIGN PATENT DOCUMENTS

| 0071911A3 | 2/1983 | European Pat. Off. . |
| 0221307 | 5/1987 | European Pat. Off. . |
| 391655A2 | 10/1990 | European Pat. Off. . |
| 478371A2 | 4/1992 | European Pat. Off. . |
| 488516A2 | 6/1992 | European Pat. Off. . |
| 60-134293 | 7/1985 | Japan . |
| 62-136624 | 6/1987 | Japan . |
| 63-141414 | 6/1988 | Japan . |
| 0484159 | 6/1992 | Japan | 345/89 |
| 0599621 | 1/1994 | Japan | 345/89 |
| 2164190A | 3/1986 | United Kingdom . |

OTHER PUBLICATIONS

IBM Technical Disclosure Bulletin, vol. 33, No. 6B, Nov. 1990, pp. 384–385, "Driving Method for TFT/LCD Grayscale.".

Patent Abstracts of Japan, Oct. 1988, abstracting JP 63-141414, Kinoshita/Matsushita.

*Primary Examiner*—Richard Hjerpe
*Assistant Examiner*—Amare Mengistu
*Attorney, Agent, or Firm*—David G. Conlin; Milton Oliver

[57] ABSTRACT

In a drive circuit for a display apparatus into which a digital video signal is input and in which a plurality of parallel signal electrodes are provided, one of signal voltages having different levels is output in accordance with the digital video signal, or two adjacent ones of said signal voltages are simultaneously output. Alternatively, one of the signal voltages is supplied to a signal electrode in one portion of one output period, and another one of the signal voltages is supplied to the signal electrode in another portion of the output period. The length ratio of the two portions of one output period is appropriately determined according to a digital video signal, whereby an arbitrary voltage corresponding to the video signal data can be applied to the pixel.

8 Claims, 25 Drawing Sheets

| INPUT | | | OUTPUT | | | | |
|---|---|---|---|---|---|---|---|
| C | B | A | $S_4$ | $S_3$ | $S_2$ | $S_1$ | $S_0$ |
| 0 | 0 | 0 | 0 | 0 | 0 | 0 | 1 |
| 0 | 0 | 1 | 0 | 0 | 0 | 1 | 1 |
| 0 | 1 | 0 | 0 | 0 | 0 | 1 | 0 |
| 0 | 1 | 1 | 0 | 0 | 1 | 1 | 0 |
| 1 | 0 | 0 | 0 | 0 | 1 | 0 | 0 |
| 1 | 0 | 1 | 0 | 1 | 1 | 0 | 0 |
| 1 | 1 | 0 | 0 | 1 | 0 | 0 | 0 |
| 1 | 1 | 1 | 1 | 0 | 0 | 0 | 0 |

| $D_2$ | $D_1$ | $D_0$ | VOLTAGE LEVEL |
|---|---|---|---|
| 0 | 0 | 0 | $V_0$ |
| 0 | 0 | 1 | $\frac{V_0+V_1}{2}$ |
| 0 | 1 | 0 | $V_1$ |
| 0 | 1 | 1 | $\frac{V_1+V_2}{2}$ |
| 1 | 0 | 0 | $V_2$ |
| 1 | 0 | 1 | $\frac{V_2+V_3}{2}$ |
| 1 | 1 | 0 | $V_3$ |
| 1 | 1 | 1 | $V_4$ |

| B | A | CTM | OUTPUT |
|---|---|---|---|
| 0 | 0 | 0 | $S_0$ |
| 0 | 0 | 1 | $S_1$ |
| 0 | 1 | 0 | $S_1$ |
| 0 | 1 | 1 | $S_2$ |
| 1 | 0 | 0 | $S_2$ |
| 1 | 0 | 1 | $S_3$ |
| 1 | 1 | 0 | $S_3$ |
| 1 | 1 | 1 | $S_4$ |

| $D_2$ | $D_1$ | $D_0$ | VOLTAGE LEVEL |
|---|---|---|---|
| 0 | 0 | 0 | $V_0$ |
| 0 | 0 | 1 | $\frac{V_0+V_1}{2}$ |
| 0 | 1 | 0 | $V_1$ |
| 0 | 1 | 1 | $\frac{V_1+V_2}{2}$ |
| 1 | 0 | 0 | $V_2$ |
| 1 | 0 | 1 | $\frac{V_2+V_3}{2}$ |
| 1 | 1 | 0 | $V_3$ |
| 1 | 1 | 1 | $\frac{V_3+V_4}{2}$ |

| A | CTM |
|---|---|
| 0 | TM |
| 1 | 1 |

| C | B | CTM | $S_1$ | $S_2$ | $S_3$ | $S_4$ |
|---|---|---|---|---|---|---|
| 0 | 0 | 0 | 0 | 0 | 0 | 0 |
| 0 | 0 | 1 | 1 | 0 | 0 | 0 |
| 0 | 1 | 0 | 0 | 0 | 0 | 0 |
| 0 | 1 | 1 | 0 | 1 | 0 | 0 |
| 1 | 0 | 0 | 0 | 0 | 0 | 0 |
| 1 | 0 | 1 | 0 | 0 | 1 | 0 |
| 1 | 1 | 0 | 0 | 0 | 0 | 0 |
| 1 | 1 | 1 | 0 | 0 | 0 | 1 |

| PIXEL VOLTAGE | $D_0$ | $D_1$ | $D_2$ |
|---|---|---|---|
| $V_1 - 1/2\Delta V$ | 0 | 0 | 0 |
| $V_1$ | 1 | 0 | 0 |
| $\dfrac{V_1 + V_2}{2}$ | 0 | 1 | 0 |
| $V_2$ | 1 | 1 | 0 |
| $\dfrac{V_2 + V_3}{2}$ | 0 | 0 | 1 |
| $V_3$ | 1 | 0 | 1 |
| $\dfrac{V_3 + V_4}{2}$ | 0 | 1 | 1 |
| $V_4$ | 1 | 1 | 1 |

| B | A | CTM |
|---|---|-----|
| 0 | 0 | 0 |
| 0 | 1 | $TM_1$ |
| 1 | 0 | $TM_2$ |
| 1 | 1 | $TM_3$ |

FIG. 23

| B | A | CTM | OUTPUT |
|---|---|-----|--------|
| 0 | 0 | 0 | $S_0$ |
| 0 | 0 | 1 | $S_1$ |
| 0 | 1 | 0 | $S_1$ |
| 0 | 1 | 1 | $S_2$ |
| 1 | 0 | 0 | $S_2$ |
| 1 | 0 | 1 | $S_3$ |
| 1 | 1 | 0 | $S_3$ |
| 1 | 1 | 1 | $S_4$ |

FIG. 24

| $D_3$ | $D_2$ | $D_1$ | $D_0$ | VOLTAGE |
|---|---|---|---|---|
| 0 | 0 | 0 | 0 | $V_0$ |
| 0 | 0 | 0 | 1 | $V_{0-1}$ |
| 0 | 0 | 1 | 0 | $V_{0-2}$ |
| 0 | 0 | 1 | 1 | $V_{0-3}$ |
| 0 | 1 | 0 | 0 | $V_1$ |
| 0 | 1 | 0 | 1 | $V_{1-1}$ |
| 0 | 1 | 1 | 0 | $V_{1-2}$ |
| 0 | 1 | 1 | 1 | $V_{1-3}$ |
| 1 | 0 | 0 | 0 | $V_2$ |
| 1 | 0 | 0 | 1 | $V_{2-1}$ |
| 1 | 0 | 1 | 0 | $V_{2-2}$ |
| 1 | 0 | 1 | 1 | $V_{2-3}$ |
| 1 | 1 | 0 | 0 | $V_3$ |
| 1 | 1 | 0 | 1 | $V_{3-1}$ |
| 1 | 1 | 1 | 0 | $V_{3-2}$ |
| 1 | 1 | 1 | 1 | $V_{3-3}$ |

DRIVE CIRCUIT FOR A DISPLAY APPARATUS

This is a division of Ser. No. 08/316,812, filed on Oct. 3, 1994, which is a FWC of U.S. Ser. No. 07/768,051, filed on Sep. 27, 1991, now abandoned.

BACKGROUND OF THE INVENTION

1. Field of the Invention

This invention relates to a drive circuit for a display apparatus, and more particularly to a drive circuit for a display apparatus which is capable of gray-scale display by an amplitude modulation drive. In this specification, a matrix type liquid crystal display apparatus will be described as a typical example of a display apparatus, but this invention can also be applied to drive circuits for other types of display apparatus such as electroluminescent (EL) display apparatus and plasma display apparatus.

2. Description of the Prior Art

When driving a liquid crystal display (LCD) apparatus, since the speed of response of a liquid crystal is very slow as compared with a luminescent material used in a cathode ray tube (CRT) display apparatus, a special drive circuit is used. That is, in a drive circuit for an LCD apparatus, video signals which are sequentially sent are not immediately supplied to respective pixels, but the video signals are sampled for each of the respective pixels in one horizontal period and held for the horizontal period. The held video signals are output at the same time at the beginning of the next horizontal period, or at an appropriate point of time in the next horizontal period. After the output of video signal voltages to the respective pixels are begun, the signal voltages are held for a period of time sufficiently over the speed of response of the liquid crystal.

In order to hold the signal voltages, a prior art drive circuit utilizes capacitors. FIG. 32 shows a signal voltage output circuit (a source driver) for supplying drive voltages to a plurality of pixels (in this case, 120 pixels) on one scanning line selected by a scanning signal. A portion for the nth pixel of the source driver is shown in FIG. 33. The portion includes an analog switch $SW_1$, an sampling capacitor $C_{SMP}$, an analog switch $SW_2$, a holding capacitor $C_H$, and an output buffer amplifier A. The operation of the signal voltage output in the prior art will be described with reference to the signal timing chart of FIG. 34. Analog video signals $v_s$ to be input to the analog switches $SW_1$ are sequentially sampled in accordance with sampling clock signals $T_{SMP1}$–$T_{SMP120}$ which correspond to the respective 120 pixels on one scanning line selected by each horizontal synchronizing signal $H_{syn}$. By this sampling, the sequential instantaneous voltages $V_{SMP1}$–$V_{SMP120}$ of the video signals $v_s$ are applied to the corresponding sampling capacitors $C_{SMP}$. The nth sampling capacitor $C_{SMP}$ is charged up to the value of the video signal voltage $V_{SMPn}$ corresponding to the nth pixel, and holds this value. The signal voltages $V_{SMP1}$–$V_{SMP120}$ which are sequentially sampled and held in one horizontal period are transferred from the sampling capacitors $C_{SMP}$ to the holding capacitors $C_H$ for holding outputs, in response to an output pulse OE which is supplied to all of the analog switches $SW_2$ at the same time. Then the signal voltages $V_{SMP1}$–$V_{SMP120}$ are output to source lines $O_1$–$O_{120}$ connected to the respective pixels through the buffer amplifiers A.

To the drive circuit described above, analog video signals are supplied. When video signals are supplied in the form of digital date, a drive circuit shown in FIG. 35 is used. For the sake of simplicity, the video signal data is composed of 2 bits ($D_0$, $D_1$). That is, video signal data have four values 0–3, and a signal voltage applied to each pixel is any one of four levels $V_0$–$V_3$. FIG. 36 shows a portion for the nth source line $O_n$ in the circuit. The portion of the circuit comprises a D-type flip-flop (sampling memory) $M_{SMP}$ at a first stage and a flip-flop (holding memory) $M_H$ at a second stage which are provided for the respective bits ($D_0$, $D_1$) of the video signal data, a decoder DEC, and analog switches $ASW_0$–$ASW_3$ each of which is provided between corresponding one of four external voltage sources $V_0$–$V_3$ and a source line $O_n$.

The digital source driver operates as follows. The video signal data ($D_0$, $D_1$) are sampled at the rising of a sampling pulse $T_{SMPn}$ corresponding to the nth pixel, by the sampling memory $M_{SMP}$. At the time when the sampling for one horizontal period is completed, an output pulse OE is fed to the holding memories $M_H$. All the video signal data ($D_0$, $D_1$) held in the holding memories $M_H$ are simultaneously output to the respective decoders DEC. Each of the decoders DEC decodes the 2-bit video signal data ($D_0$, $D_1$). In accordance with the values (0 to 3), one of the analog switches $ASW_0$–$A_{SW3}$ is conductive, and the corresponding one of the four external voltages $V_0$–$V_3$ is output to the source line $O_n$.

In the example shown in FIG. 36, since the video signal data is 2 bits, 4 ($=2^2$) levels of external voltages ($V_0$–$V_3$) to be supplied to the source line $O_n$ are required. When a 4-bit video signal data is supplied, a signal voltage output circuit has a configuration shown in FIG. 37 in which $2^4=16$ levels of external voltages ($V_0$–$V_3$) are required. That is, in a drive circuit for a digital video signal constructed in such a manner, it is necessary to provide $2^n$ levels of external voltages, for n-bit video signal data.

As described above, when the number of levels of the voltages to be externally supplied increases, the following problems (1) and (2) arise.

(1) With the increase in number of levels of voltages to be supplied, the size of a voltage supplying circuit is enlarged. Therefore, the production cost is increased.

(2) Since the number of input terminals of an LSI constituting the drive circuit including the above signal voltage output circuit increases. Such an LSI is difficult to mount.

SUMMARY OF THE INVENTION

The drive circuit of this invention, which overcomes the above-discussed and numerous other disadvantages and deficiencies of the prior art, comprises: voltage supplying means for supplying a plurality of signal voltages, the levels of said signal voltages being different from each other; and voltage selecting means, connected to said voltage supplying means, for receiving said digital video signal, and for, in accordance with said digital video signal, selectively outputting one of said signal voltages or simultaneously outputting two adjacent ones of said signal voltages.

In another aspect of the invention, the drive circuit for a display apparatus comprises: voltage supplying means for supplying a plurality of signal voltages, the levels of said signal voltages being different from each other; and voltage selecting means, connected to said voltage supplying means, for receiving said digital video signal, and for, in accordance with said digital video signal, selectively outputting one of said signal voltages in one portion of a signal output period and another of said signal voltages in another portion of said signal output period.

The voltage selecting means supplies a first voltage to a signal electrode in a first period of one output period, and supplies a second voltage in the residual period. Due to the electric capacitance of a pixel connected to the signal electrode, by appropriately determining the time periods in which the first and second voltages are supplied, respectively, the signal voltage to be actually applied to the pixel can be set to a middle voltage of the first and second voltages.

In a further aspect of the invention, the drive circuit for a display apparatus comprises: voltage supplying means for supplying a plurality of signal voltages, the levels of said signal voltages being different from each other; time control means for receiving one portion of said digital video signal, and for producing a time division signal indicative of two or more divided periods of one signal output period; and voltage selecting means, connected to said voltage supplying means and said time control means, for receiving said digital video signal, for, in accordance with said time division signal, outputting none of said signal voltages in one of said divided periods, and for, in accordance with the remaining portion of said digital video signal, selectively outputting one of said signal voltages in another of said divided periods.

The voltage selecting means does not supply a voltage to a signal electrode in a first period of one output period, but supplies a voltage with a level corresponding to video signal data in the residual second period. Due to the electric capacitance of a pixel connected to the signal electrode, even when a voltage with a constant level is supplied to the signal electrode, a voltage applied to a pixel gradually comes closer to a supplied voltage in accordance with a predetermined curve. Therefore, by determining the level of the voltage supplied to the signal electrode and the length of the second period in which the voltage is supplied, the timing at which the level of the signal voltage applied to the pixel reaches a desired value can coincide with the timing at which the output period is terminated and the supply of the voltage to the signal voltage is completed. Accordingly, by appropriately adopting respective cases where the voltage from the voltage supplying means is supplied to the signal electrode as it is, and where the voltage supply is performed in a time controlled manner, voltages the number of which is greater than that of external voltage levels can be applied to a pixel. The adoption of the cases is controlled by the time control means.

In a further aspect of the invention, the drive circuit for a display apparatus comprises: voltage supplying means for supplying a plurality of signal voltages, the levels of said signal voltages being different from each other; time control means for receiving one portion of said digital video signal, and for producing a time division signal indicative of two or more divided periods of one signal output period; and voltage selecting means, connected to said voltage supplying means and said time control means, for receiving said digital video signal, for, in accordance with said time division signal and the remaining portion of said digital video signal, outputting one of said signal voltages in one of said divided periods, and for outputting another one of said signal voltages in another one of said divided periods.

The voltage selecting means supplies a first voltage to a signal electrode in a first period of one output period, and supplies a second voltage in the second period. Due to the electric capacitance of a pixel connected to the signal electrode, by changing the length ratio of the first and second periods in which the first and second voltages are supplied, respectively, the signal voltage to be applied to the pixel can be set to an arbitrary voltage between the first and second voltages. Therefore, the length ratio of the first and second periods of the pulse signal generated by the time control means is appropriately determined according to a portion of video signal data, whereby an arbitrary voltage corresponding to the video signal data can be applied to the pixel.

In the above drive circuits of the invention, said voltage selecting means may be provided for each of said signal electrodes.

In the above drive circuits of the invention, said voltage selecting means may comprise: a plurality of switch means, the number of said switch means being equal to the number of said signal voltages; and selection means for producing selection signals, said selection signals respectively controlling said switch means.

Thus, the invention described herein makes possible the objectives of:

(1) providing a drive circuit which can drive a display device with a gray-scale using a reduced number of signal voltages having different levels;

(2) providing a drive circuit which can produce a plurality of signal voltages with more fine steps than voltages supplied from a voltage source; and (3) providing a drive circuit which can drive a display apparatus with a fine gray-scale display.

BRIEF DESCRIPTION OF THE DRAWINGS

This invention may be better understood and its numerous objects and advantages will become apparent to those skilled in the art by reference to the accompanying drawings as follows:

FIG. 23 shows the logical relationships between the inputs and outputs of a time selection circuit used in the embodiment of FIG. 22.

FIG. 24 shows the logical relationships between the inputs end outputs of a voltage selection selection circuit used in the embodiment of FIG. 22.

FIG. 28 illustrates the relationships between digital video signals and output voltages in the embodiment of FIG. 22.

DESCRIPTION OF THE PREFERRED EMBODIMENTS

Figures 1, 2:
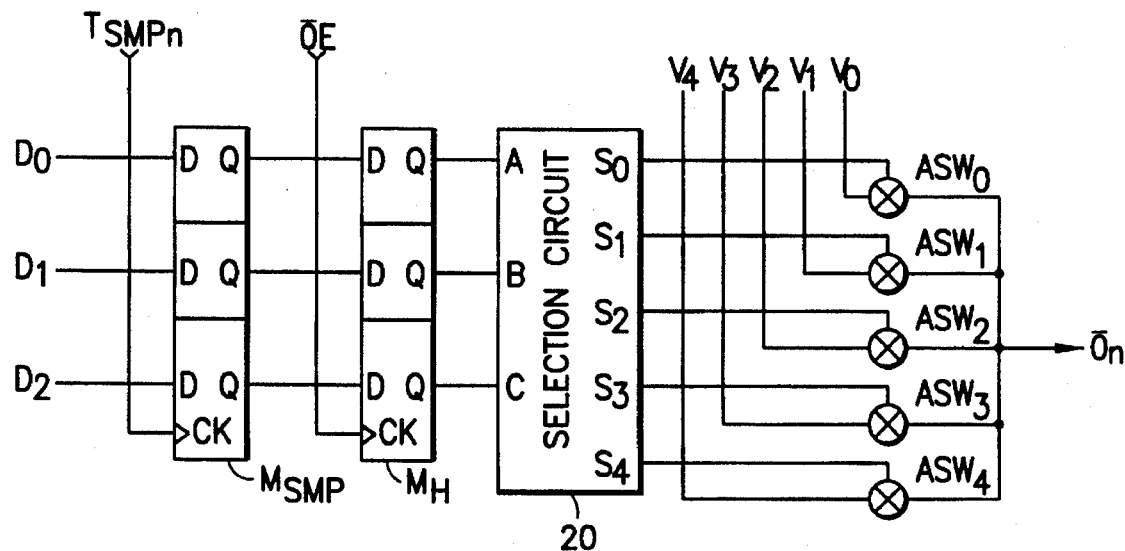
FIG. 1 is a block diagram illustrating one embodiment of the invention.
FIG. 2 shows the logical relationships between the inputs and outputs of a selection circuit used in the embodiment of FIG. 1.

FIG. 1 shows an embodiment of the invention. In FIG. 1, a digital video signal data of 3 bits is supplied to a signal voltage output circuit for the nth signal line (source line) of a drive circuit for an LCD apparatus. The circuit comprises a sampling flip-flop $M_{SMP}$, a holding flip-flop $M_H$, a selection circuit 20, and five analog switches $ASW_0$–$ASW_4$. Each of the sampling flip-flop $M_{SMP}$ and the holding flip-flop $M_H$ comprises three D-type flip-flops corresponding to the respective bits $D_0$, $D_1$ and $D_2$ of a digital video signal data. The terminals of the five analog switches $ASW_0$–$ASW_4$ are connected to external voltage sources with five levels $V_0$–$V_4$ ($V_0 < V_1 < V_2 < V_3 < V_4$), respectively. The other terminals are commonly connected to the nth source line $O_n$. The control terminals of the analog switches $ASW_0$–$ASW_4$ receive the outputs $S_0$–$S_4$ of the selection circuit 20, respectively.

The bits of a digital video signal date ($D_0$, $D_1$, $D_2$) supplied to the sampling flip-flop $M_{SMP}$ are sequentially sampled in accordance with a sampling pulse $T_{SMPn}$ corresponding to the source line $O_n$ and supplied to the holding flip-flop $M_H$. After completing the sampling of video signal data for all pixels on one scanning line, the data ($D_0$, $D_1$, $D_2$) held in the holding flip-flop $M_H$ is fed to the selection circuit 20 through the inputs A, B and C by an output pulse OE applied to the holding flip-flop $M_H$.

The table of FIG. 2 shows the relationship among the values of the inputs A, B and C and the values of the outputs $S_0$–$S_4$ of the selection circuit 20. For example, when the video signal data ($D_0$, $D_1$, $D_2$)=(A, B, C) is (0, 0, 0), only the output $S_0$ is 1 and all the other outputs $S_1$–$S_4$ are 0. Thus, only the analog switch $ASW_0$ is conductive and the external power source voltage $V_0$ is supplied to the source line $O_n$. When (A, B, C)=(0, 1, 0), only the output $S_1$ is 1. Thus, only the analog switch $ASW_1$ is conductive and the power source voltage $V_1$ is supplied to the source line $O_n$. In the same manner, the power source voltage $V_2$ is supplied when (A, B, C)=(0, 0, 1), $V_3$ is supplied when (A, B, C)=(0, 1, 1), and $V_4$ is supplied when (A, B, C)=(1, 1, 1). In the above cases, an external voltage having one level is supplied to the source line $O_n$.

Figures 3, 4:
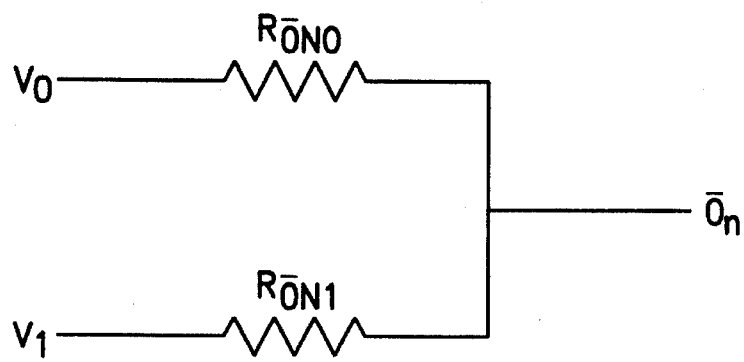
FIG. 3 shows an equivalent circuit of analog switches and one source line in the case that two analog switches are simultaneously conductive in the embodiment of FIG. 1.
FIG. 4 shows the relationships between digital video signals and voltages applied to pixels.

When the video signal data ($D_0$, $D_1$, $D_2$)=(A, B, C) is (1, 0, 0), one of the outputs $S_0$ and $S_1$ of the selection circuit 20 is 1, and the other outputs $S_2$, $S_3$, $S_4$ are 0. Thus, the two analog switches $ASW_0$ and $ASW_1$ are conductive at the same time, and both the external voltage sources $V_0$ and $V_1$ are connected to the source line $O_n$. The equivalent circuit in this case is shown in FIG. 3. In this figure, $R_{ON0}$ indicates the resistance of the analog switch $ASW_0$ and $R_{ON1}$ indicates the resistance of the analog switch $ASW_1$ in the conductive state. In the case of FIG. 3, the voltage $V_{ON}$ supplied to the source line $O_n$ in a steady state is expressed as follows:

$$V_{ON} = \frac{R_{ON1} \cdot V_0 + R_{ON0} \cdot V_1}{R_{ON0} + R_{ON1}}$$

This expression shows the condition of $V_0 < V_{ON} < V_1$, and namely the voltage $V_{ON}$ supplied to the source line $O_n$ has a level between the levels of external voltages $V_0$ and $V_1$. When the on-resistances $R_{ON0}$ and $R_{ON1}$ are set equal to each other ($R_{ON0} = R_{ON1}$), the voltage $V_{ON}$ is expressed by the following expression:

$$V_{ON} = (V_0 + V_1)/2$$

Accordingly, it is possible to supply a voltage with a middle level of $V_0$ and $V_1$. In the same way, in the embodiment, the on-resistances of the analog switches $ASW_0$–$ASW_4$ are equal to each other. Thus, the voltage with a level of $(V_1 + V_2)/2$ can be supplied to the source line $O_n$ when ($D_0$, $D_1$, $D_2$)=(A, B, C)=(1, 1, 0), and the voltage with a level of $(V_2+V_3)/2$ can be supplied to the source line $O_n$ when (A, B, C)=(1, 0, 1). The above embodiment has been described in the case where two levels of external voltages are supplied to the source line $O_n$ at the same time.

FIG. 4 summarizes the relationship among the values of digital video signal data $D_0$, $D_1$ and $D_2$ to be fed to the drive circuit for an LCD apparatus of the invention and the values of the voltage supplied to the source line $O_n$. As seen from the table of FIG. 4, the drive circuit of the invention can perform a display of eight gray-scale levels with using external voltages having only five levels.

Figure 5:
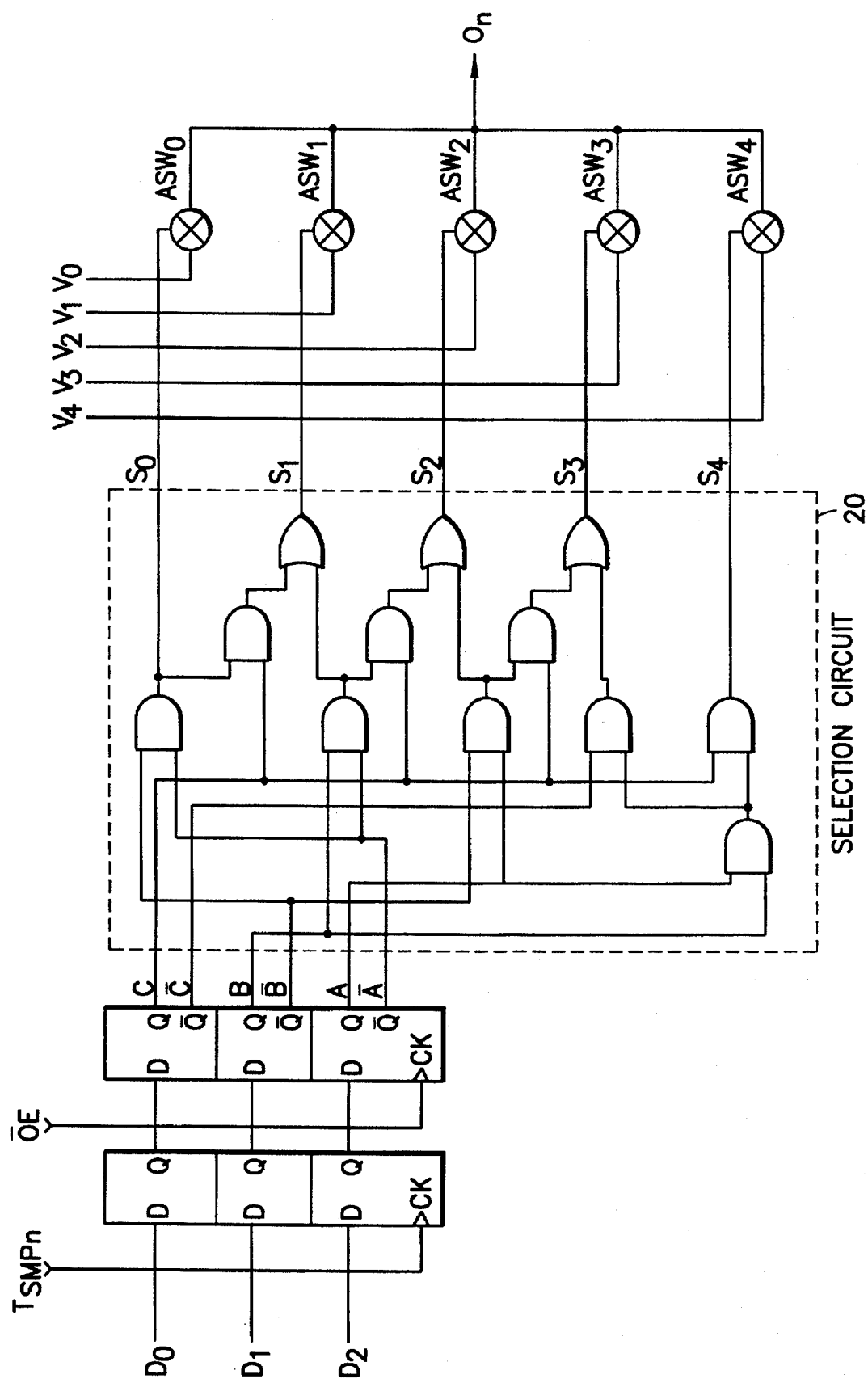
FIG. 5 is a circuit diagram illustrating in more detail the selection circuit of the embodiment of FIG. 1.
Figure 38:
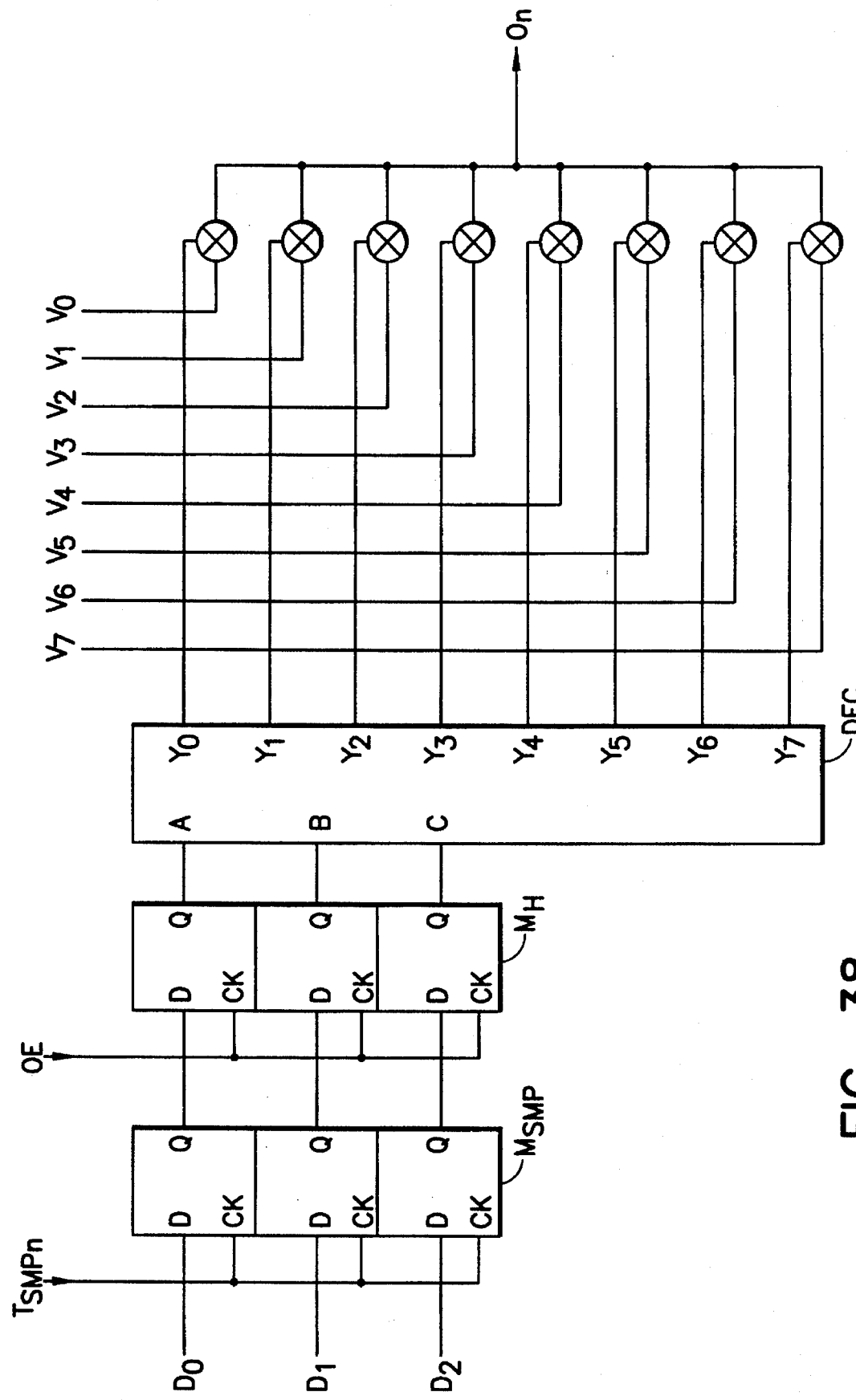
FIG. 38 illustrates a portion of a drive circuit for one source line which receives 3-bit digital video signals.

FIG. 5 shows an example in which the selection circuit 20 shown in FIG. 1 is a logic circuit including AND gates and OR gates. In this example, the following logic expressions which are led from the logic table of FIG. 2, and realized by the arrangement of AND gates and OR gates shown in FIG. 5:

$S_0=\bar{A}.\bar{B}$ $S_1=\bar{A}.\bar{B}.C+A+ee.B$ $S_2=\bar{A}.B.C+A.fheight\bar{B}$ $S_3=A.\bar{B}.C+A.B.+e,ovs\ C$ $S_4=A.B.C$ In this embodiment, the digital video signal data is 3 bits. As shown in FIG. 38, when one of the external voltages is selected to be supplied to a pixel as it is, the required number of external voltage levels is $2^3=8$. However, in this embodiment, since a middle level between two external voltage levels can be produced, it is sufficient only to provide external voltages with five levels. In the same way, for 4-bit video signal data, it is necessary to provide external voltages with $2^4=16$ levels in the above configuration. This embodiment necessitates external voltages with $2^3+1=9$ levels. As described above, for n-bit video signal data, this embodiment requires external voltage levels of $2^{(n-1)}+1$. On the contrary, conventionally, since the voltage levels to be supplied to a pixel are obtained from external voltages, it is necessary to provide external voltage levels of $2^n$. Therefore, in this embodiment, the burden of the voltage supplying circuit can be reduced and the number of terminals of the drive circuit can be reduced. According to the invention, the degree of reduction in the number of required external voltage levels is greater with the increase in the number of bits of a video signal data.

According to the invention, when signal voltages with different levels are supplied to a pixel based on digital video signal data so as to perform a gray-scale display, there are two cases where an external voltage with one level is supplied to a signal electrode as the signal voltage, and where external voltages with two levels are supplied at the same time. When two levels are supplied at the same time, a voltage with a middle level between these two levels can be supplied to a pixel. Therefore, a predetermined number of scale levels can be attained without using the same number of external voltages but with a reduced number of external voltages. Accordingly, the external voltage supplying circuit can be made smaller and the number of terminals of the driver circuit for a display circuit can be reduced. Furthermore, since the steps between adjacent voltages applied to the pixel can be more minute than the steps between adjacent levels of external voltage sources, minute gray-scale display can be attained when voltages with minute differences are difficult to produce in an external voltage producing circuit.

Figures 6, 7:
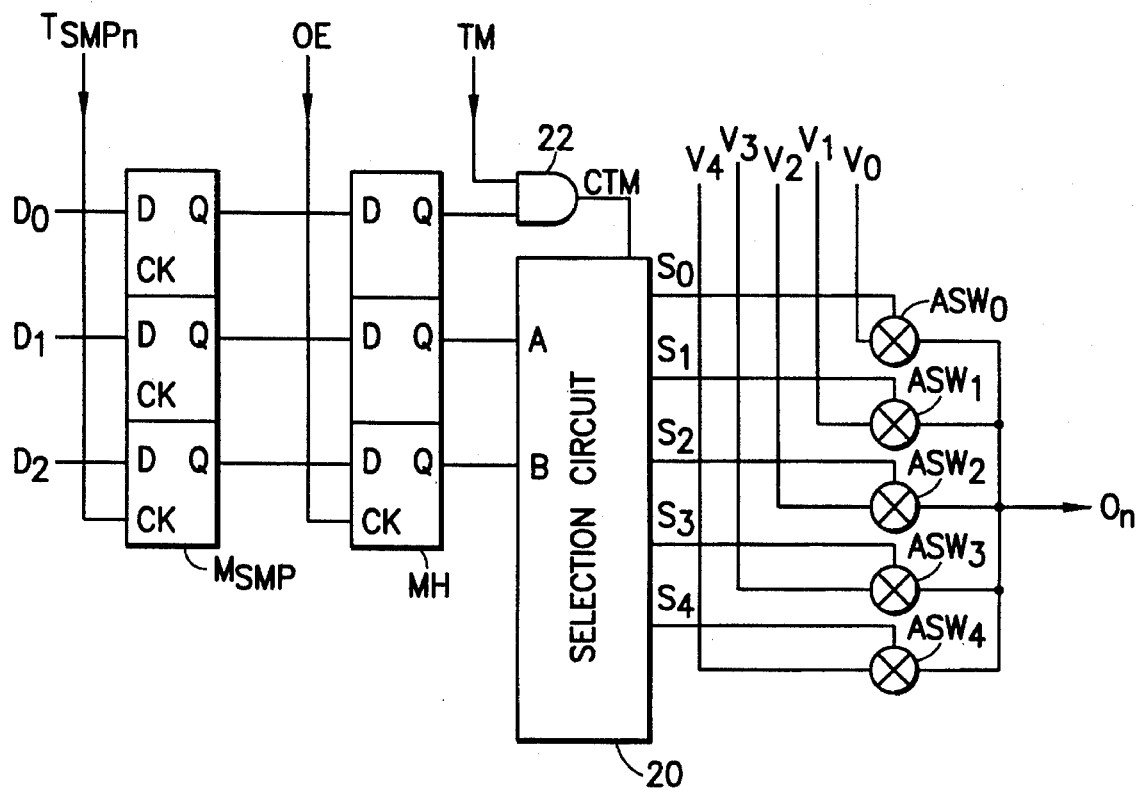
FIG. 6 is a block diagram illustrating another embodiment of the invention.
FIG. 7 shows the logical relationships between the inputs end outputs of a selection circuit used in the embodiment of FIG. 6.

FIG. 6 shows another embodiment of the invention. In the embodiment of FIG. 6, the selection circuit 20 has only two input terminals A and B, and an AND gate 22 is provided. The sampling flip-flop $M_{SMP}$ and the holding flip-flop $M_H$ have the same configuration as those used in the embodiment of FIG. 1. The upper 2 bits $D_2$ and $D_1$ of the video signal data held in the holding flip-flop $M_H$ are fed to the selection circuit 20 through the terminals A and B as they are. The lowest significant bit $D_0$ of the video signal data is fed into the AND circuit 22 together with a control signal TM, and the resulting signal CTM is fed to the selection circuit 20.

FIG. 7 shows the relationship among the values of the inputs A, B and CTM of the selection circuit 20 and the output (one of $S_0$–$S_4$) selected by the selection circuit 20. When, for example, the video signal data ($D_0$, $D_1$, $D_2$) is (0, 0, 0), (A, B, CTM) are always (0, 0, 0) irrespective of the value of the control signal TM, and the selection circuit 20 selects the output $S_0$. As a result, only the analog switch $ASW_0$ is conductive and the power source voltage $V_0$ is supplied to the source line $O_n$. When the video signal data ($D_0$, $D_1$, $D_2$) is (1, 0, 0), the output of the selection circuit 20 depends on the value of the control signal TM. Since the input CTM is 0 during the Low level period of the control signal TM, the selection circuit 20 selects the output $S_0$ and the voltage $V_0$ is supplied to the source line $O_n$. When the control signal TM becomes High, the input CTM is 1 and the selection circuit 20 selects the output $S_1$, whereby the voltage $V_1$ is supplied to the source line $O_n$. The conditions of the output pulse OE, the control signal TM and the change of the signal for the source line $O_n$ are shown in the timing chart of FIG. 8.

Figure 9:
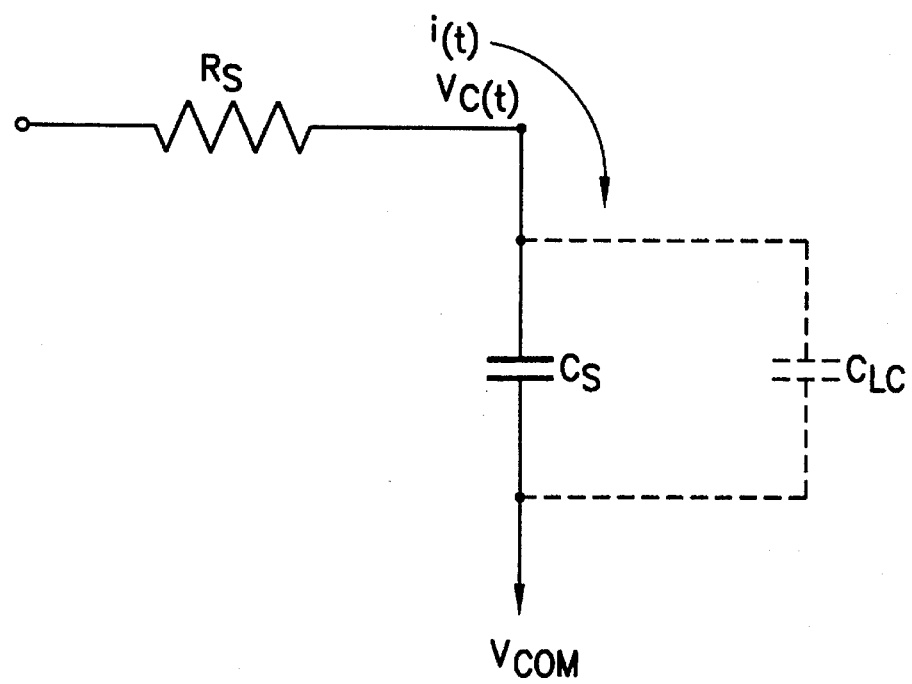
FIG. 9 shows an equivalent circuit of one source line.
Figures 10, 11:
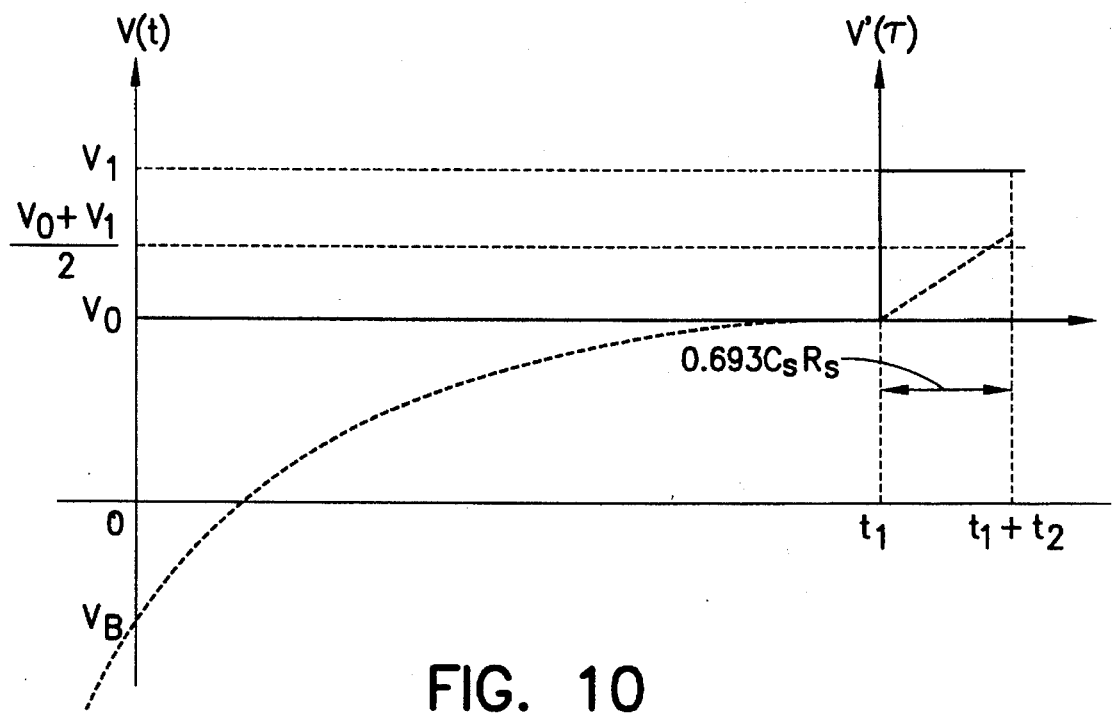
FIG. 10 shows the variation in the voltage level applied to pixels in the embodiment of FIG. 6.
FIG. 11 shows the relationships between digital video signals and voltages applied to pixels.

The equivalent circuit of the load for the source line $O_n$ is shown in FIG. 9. In this figure, $R_s$ represents the whole resistance of the source line, $C_s$ represents the capacitance of the source line, $v_c(t)$ indicates a potential at a point A, and $V_{COM}$ indicates a voltage applied to an opposite electrode. Actually, the capacitance $C_{LC}$ of the pixel is formed in parallel with the capacitance $C_s$, as shown by a broken line in FIG. 9. However, the capacitance $C_{LC}$ is extremely smaller than the source line capacitance $C_s$ (e.g., $C_s=160$ pF, $C_{LC}=0.2$ pF), so that the capacitance $C_{LC}$ may be disregarded. Accordingly, the potential $v_c(t)$ at the point A can be regarded as the voltage between the pixel electrode and the opposite electrode. FIG. 10 shows the change in the voltage of the source line $O_n$ in more detail. As shown in FIG. 10, the control signal TM is Low during the first half $t_1$ of the period of the output pulse OE and High during the last half $t_2$. The voltage v(t) of the source line $O_n$ changes as follows:

$$v(t)=V_0 \ (0<t\leq t_1)$$

and $$v(t)=V_1 \ (t_1<t\leq t_1+t_2)$$

The voltage $v_c(t)$ of the pixel connected to the source line $O_n$ is obtained by solving the following simultaneous equations:

$$V_0=R_s.i(t)+(1/C_s)\int i(t)dt$$

$$v_c(t)=(1/C_s)\int i(t)dt+V_B$$

where i(t) is a current flowing through the source lane $O_n$, and $V_B$ is a potential at the point A when t=0, i.e., a voltage of the source line in the previous horizontal scanning period. The solution of these simultaneous equations are effected as follows:

$$v_c(t)=V_B+V_0 \cdot \{1-exp(-t/(C_s \cdot R_s))\}$$

Accordingly, the voltage $v_c(t)$ comes closer to the voltage $V_0$ as shown by a broken line in FIG. 10. In view of the rising characteristic of the voltage, when designing a liquid crystal panel, the values of the capacitance $C_s$ and the resistance $R_s$ are such determined that the voltage $v_c(t)$ comes sufficiently closer to the voltage $V_0$ in the period of the output pulse OE.

Next, the change in the voltage $v_c(t)$ after $t_1$ is obtained by solving the following simultaneous equations:

$$V_1-V_0=R_s \cdot i(\tau)+(1/C_s)\int i(\tau)d\tau$$

$$v_c'(\tau)=(1/C_s)\int i(\tau)d\tau$$

In these equations, a coordinate transformation is performed as follows:

$$t=\tau+t_1$$

$$v=v'+V_0$$

The solution of the above simultaneous equations is effected as follows:

$$v_c'(\tau)=(V_1-V_0) \cdot \{1-exp(-\tau/(C_s \cdot R_s))\}$$

The time period required for the voltage of the pixel to reach the middle voltage $(V_0-V_1)/2$ (for the v-coordinate axis, $(V_0+V_1)/2$) of $V_1$ and $V_0$ is obtained by the following equation:

$$(V_1-V_0)/2=(V_1-V_0) \cdot \{1-exp(-\tau/(C_s \cdot R_s))\}$$

The solution is:

$$\tau = (\ln 2) \cdot C_s \cdot R_s$$
$$= 0.693 \times C_s \cdot R_s$$

As is apparent from the equation, the time period $\tau$ is independent of the external voltages $V_0$, $V_1$ and $V_B$. Accordingly, the time period $\tau$ is constant when any two adjacent voltage levels are selected from the external voltages $V_0-V_4$ by the selection circuit 20. Therefore, when the time period $t_2$ for which the control signal TM is High conforms with the time period $\tau$ obtained by the above equation, the voltage of the pixel can take the middle value between $V_0$ and $V_1$.

Figure 8:
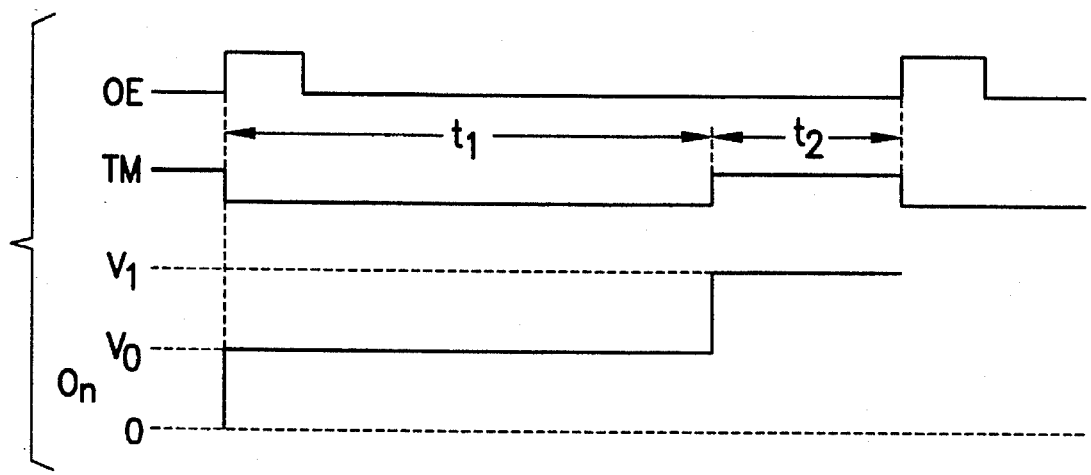
FIG. 8 is a timing chart illustrating the operation of the embodiment of FIG. 6.

The table of FIG. 11 shows the relationship among the values of $D_0$, $D_1$ and $D_2$ of a video signal data and the voltage applied to the pixel in this embodiment. When the lowest significant bit $D_0$ of the video signal data is 0, the output of the selection circuit 20 is constant irrespective of the change in the control signal TM, so that the voltage supplied to the source line $O_n$ takes a constant value $V_0$, $V_1$, $V_2$ or $V_3$. When the lowest significant bit $D_0$ is 1, the output of the selection circuit 20 changes as the control signal TM changes in one period of the output pulse OE as shown in FIG. 8, and the external voltages with adjacent two levels are sequentially supplied to the source line $O_n$. Especially, since the time period $\tau$ for which the voltage is supplied in the last half is determined by the above equation, the middle values $(V_0+V_1)/2$, $(V_1+V_2)/2$, $(V_2+V_3)/2$, $(V_3+V_4)/2$ of the respective adjacent levels are applied to the liquid crystal. Accordingly, in this embodiment, only five levels of external voltages $V_0-V_4$ are required when eight levels of voltages corresponding to the 3-bit video signal data are supplied to the pixel.

Figure 12:
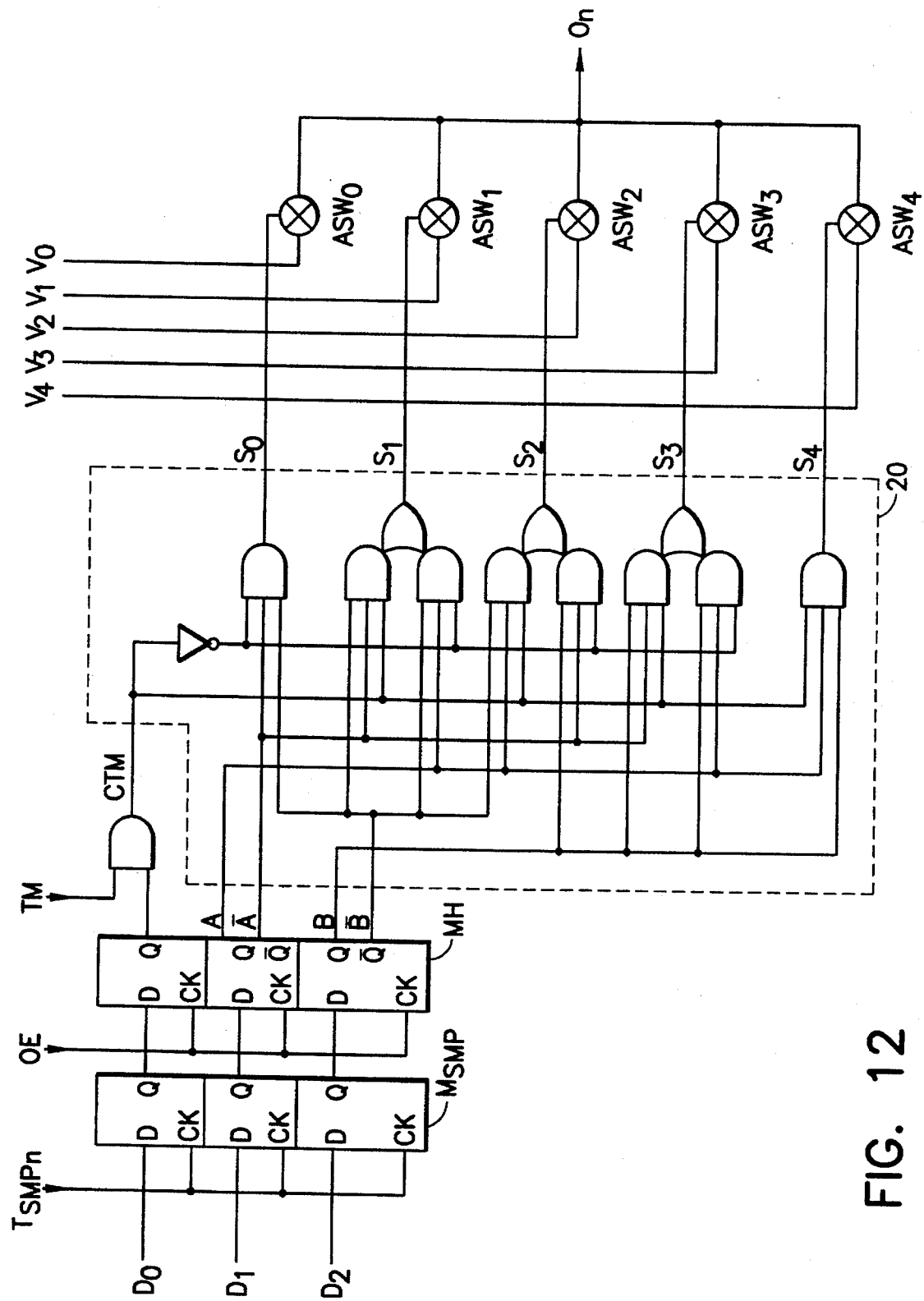
FIG. 12 is a circuit diagram illustrating in more detail the selection circuit of the embodiment of FIG. 6.

An example in which the selection circuit 20 shown in FIG. 6 is realized by AND gates, OR gates and an inverter is shown in FIG. 12. In this example, the following logic expressions are led from the logic table of FIG. 7. In the following expressions, CTM is represented by T:

$$S_0=\bar{B}.\bar{A}.\bar{T}$$

$$S_1=B+ee \cdot \bar{A}.T+\bar{B}.A.fheight\bar{T}$$

$$S_2=\bar{B}.A.T+B.\bar{A}.fheightT$$

$$S_3=B.\bar{A}.T+B.A.+e,ovs\ T$$

$$S_4=B.A.T$$

As seen from above, when video signal data is n bits, only $2^{(n-1)}+1$ levels are required also in this embodiment.

Figure 13:
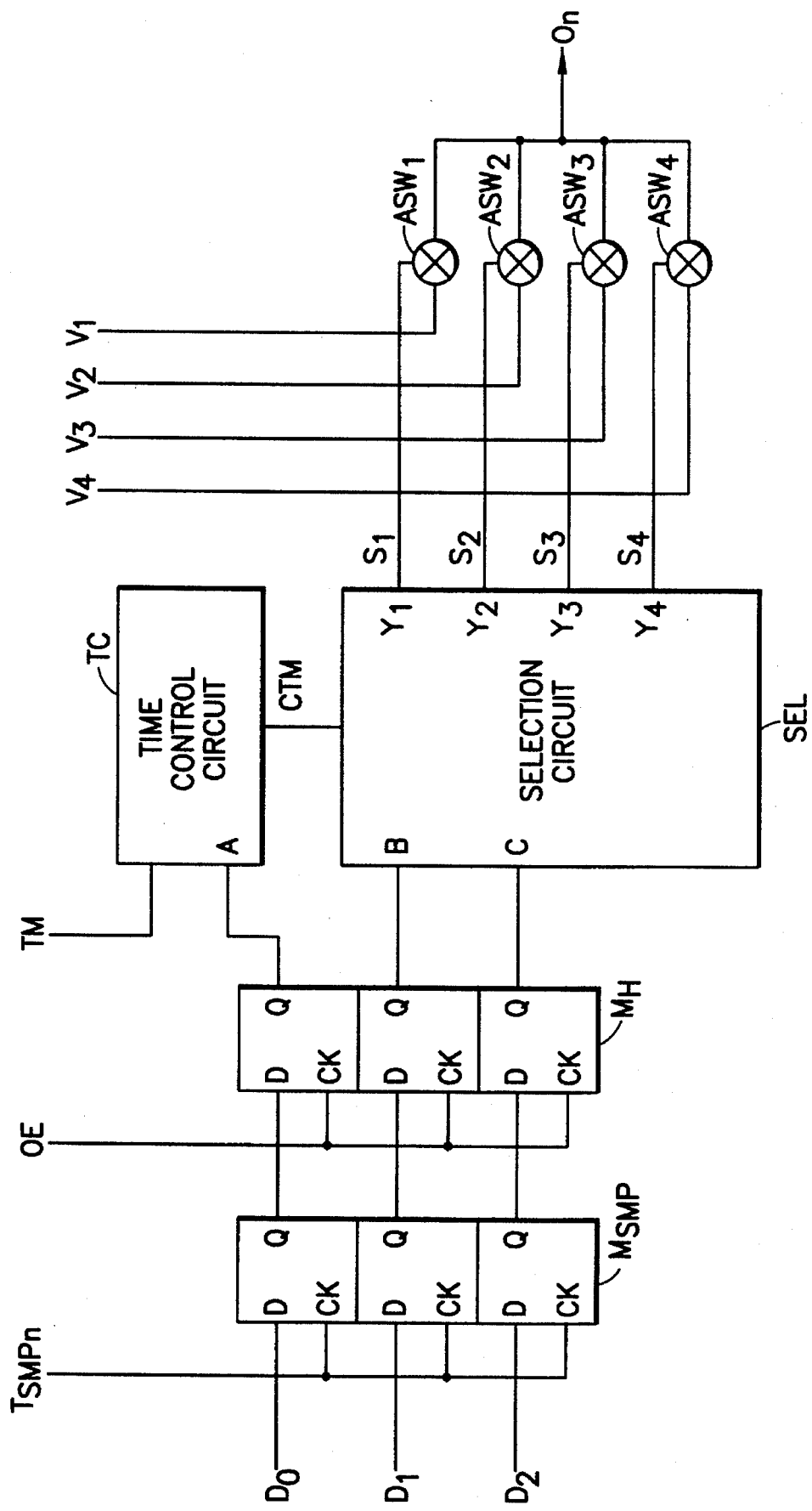
FIG. 13 is a block diagram illustrating a further embodiment of the invention.

FIG. 13 shows a further embodiment of the invention. This embodiment comprises a sampling memory $M_{SMP}$, an output holding memory (holding memory) $M_H$, a time control circuit TC, a selection circuit SEL, and four analog switches $ASW_1-ASW_4$. The sampling memory $M_{SMP}$, holding memory $M_H$ and selection circuit SEL are similar in construction as those used in the embodiment of FIG. 6.

Among the outputs of the holding memory $M_H$, the least significant bit $D_0$ of the digital video signal data is fed to the time control circuit TC, and the other bits (in this embodiment, the upper 2 bits $D_1$ and $D_2$) are fed to the selection circuit SEL through the inputs B and C.

Figures 14, 15, 16:
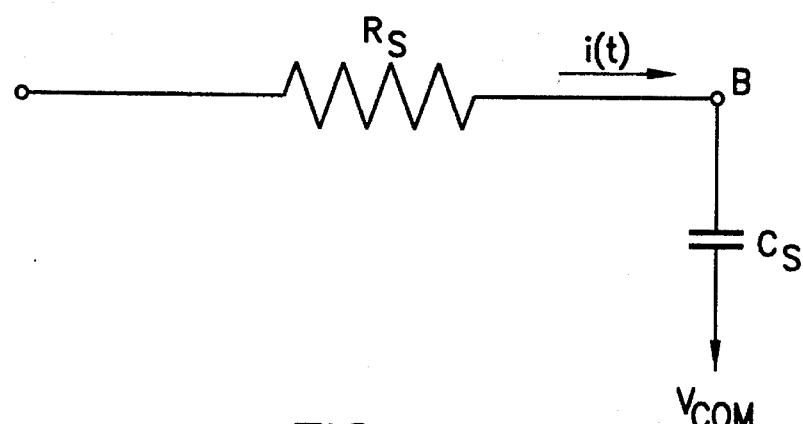
FIG. 14 shows the logical relationships between the inputs and outputs of a time control circuit used in the embodiment of FIG. 13.
FIG. 15 shows the logical relationships between the inputs and outputs of a selection circuit used in the embodiment of FIG. 13.
FIG. 16 shows an equivalent circuit of one source line.

The time control circuit TC receives, in addition to the 1-bit data from the holding memory $M_H$ (the least significant bit $D_0$ of the video signal data), an external pulse signal (a time control pulse signal) TM at an input terminal A. The output CTM of the time control circuit TC is fed to the selection circuit SEL together with the upper bits of the video signal data (in this embodiment, 2 bits ($D_1$, $D_2$)). Based on these inputs, the selection circuit SEL makes one of four outputs $S_1-S_4$ High or 1 in accordance with the logic described below. Thus, the corresponding one of the analog switches $ASW_1-ASW_4$ is conductive, and one of the external voltages $V_1-V_4$ ($V_1<V_2<V_3<V_4$) is supplied to the source line $O_n$ The logic table of FIG. 14 illustrates the relationship between the input A ($D_0$) and the output CTM of the time control circuit TC. When the value of the input data is 0 (i.e., $D_0=0$), the input pulse signal TM is output as it is. When $D_0=1$, the output CTM is always 1.

The logic table of FIG. 15 illustrates the relationship among the inputs B, C and CTM and the output of the selection circuit SEL. When the input CTM is 0, all the outputs $S_1-S_4$ are 0, irrespective of the values of the other inputs B and C (i.e., the upper bits of the video signal data). When the input CTM is 1, only the output $S_X$ (X=Y+1) according to the value Y indicated by the other inputs (B and C) (in this embodiment, a 2-bit binary digit value in which C is the high bit and B is the lower bit) is 1.

Figure 35:
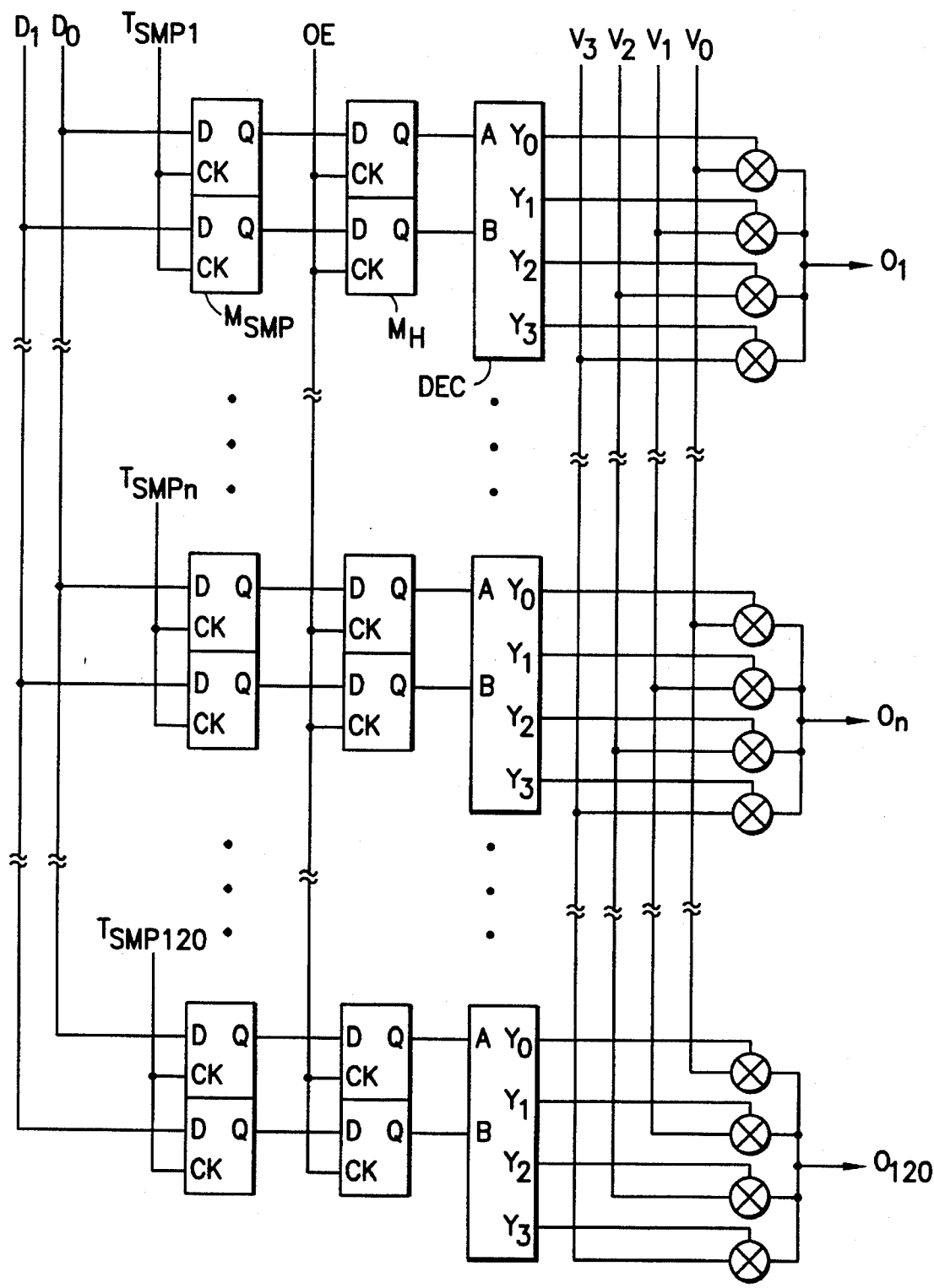
FIG. 35 illustrates a drive circuit in which a digital sampling unit is provided for each source line.
Figure 36:
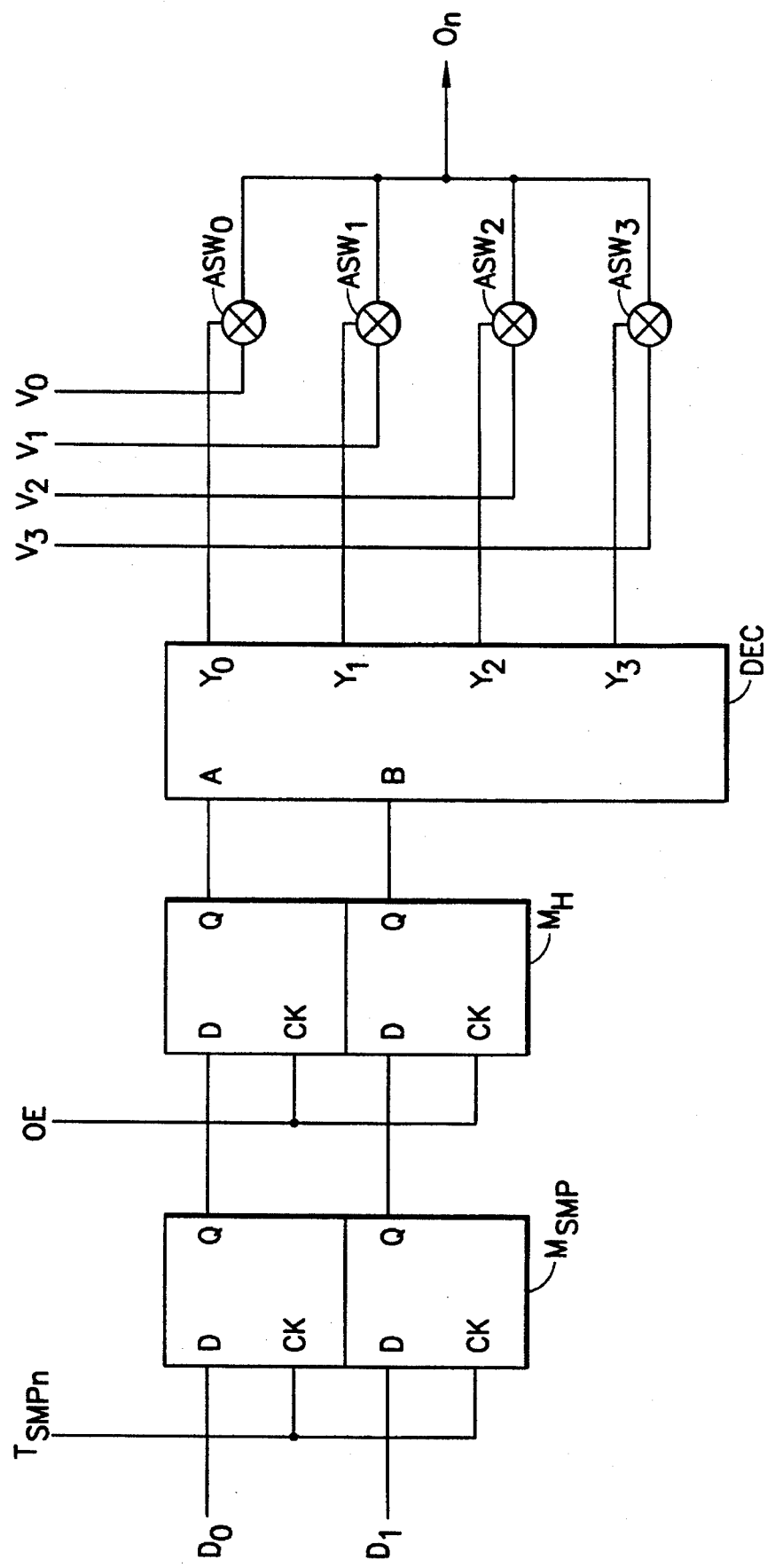
FIG. 36 illustrates a portion of the drive circuit of FIG. 35 for one source line.

The embodiment of FIG. 13 operates as follows when the time control circuit TC and the selection circuit SEL perform the outputs in accordance with the above-mentioned logic. When the least significant bit $D_0$ of the video signal data is 1, the output CTM of the time control circuit TC is always 1, and the selection circuit SEL operates in the same manner as the decoder (the decoder DEC shown in FIGS. 35 and 36) which receives the upper 2 bits ($D_1$, $D_2$) of the video signal data. In other words, one of the outputs $S_1$–$S_4$ is selected to be 1 in accordance with the values of the upper 2 bits of the video signal data, so that the corresponding analog switch $ASW_i$ is conductive and one of four levels of external voltages $V_1$–$V_4$ is supplied to the source line $O_n$.

When the least significant bit $D_0$ of the video signal data is 0 and the time control pulse signal TM is High or 1, the selection circuit SEL operates in the same manner as described above. During the Low level (0) period of the pulse signal TM, all of the outputs $S_1$–$S_4$ of the selection circuit SEL are 0 irrespective of the values of the upper 2 bits of the video signal data, and the source line $O_n$ is in a high impedance state. That is, when the least significant bit of the video signal data is 0, the output period of the external voltages to the source line $O_n$ can be controlled by the pulse signal TM.

The equivalent circuit of the load for the source line $O_n$ is shown in FIG. 16. In FIG. 16, $R_s$ indicates the resistance of the source line, $C_s$ indicates the capacitance of a liquid crystal pixel connected to the source line $O_n$, and $V_{COM}$ represents a common voltage applied to the opposite electrode to the liquid crystal. It is assumed that the tame when the time control pulse signal TM changes from Low to High is t=0. The voltage v(t) supplied from the source drive of FIG. 13 to the source line $O_n$ is expressed as follows:

$$v(t)=0 \ (t<0)$$

and $$v(t)=V_i \ (0 \leq t)$$

The voltage $v_c(t)$ across the capacitance $C_s$ of the pixel which is a load for the source line $O_n$ in accordance with the change in the supplied voltage can be obtained by solving the following simultaneous equations:

$$V_i = R_s \cdot i(t) + (1/C_s) \int i(t) dt$$

$$v_c(t) = (1/C_s) \int i(t) dt + V_{COM}$$

where i(t) indicates a current flowing through the source line $O_n$. The solution of the simultaneous equations is effected as follows:

$$v_c(t)=V_{COM}+V_i \cdot \{1-exp(-t/(C_s \cdot R_s))\} \quad (1)$$

Figure 17:
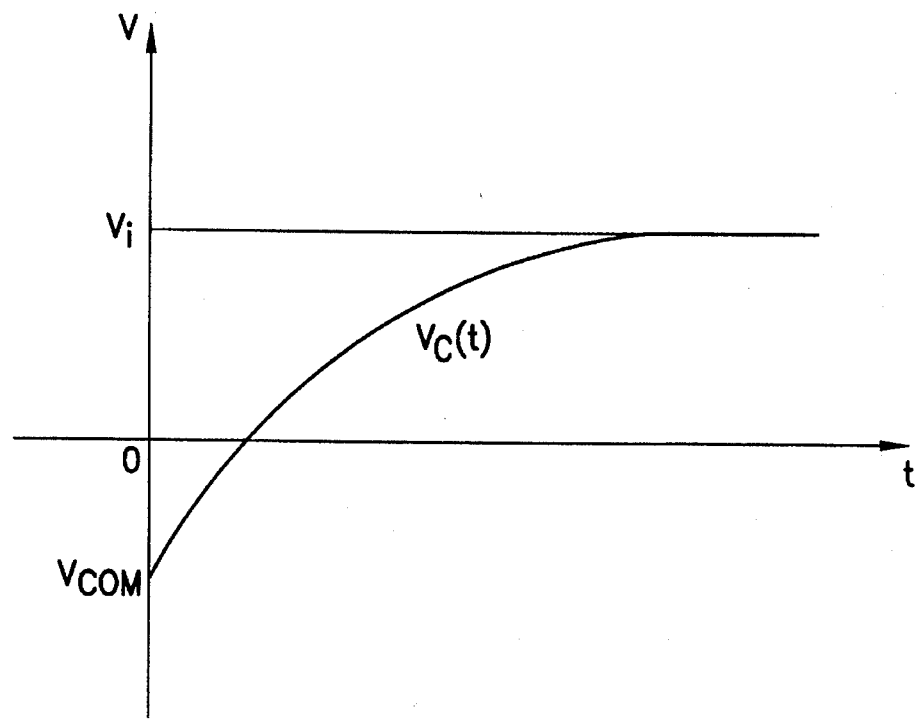
FIG. 17 illustrates the relationship between the variation in the voltage level output on a source line and the voltage applied to a pixel.
Figure 18:
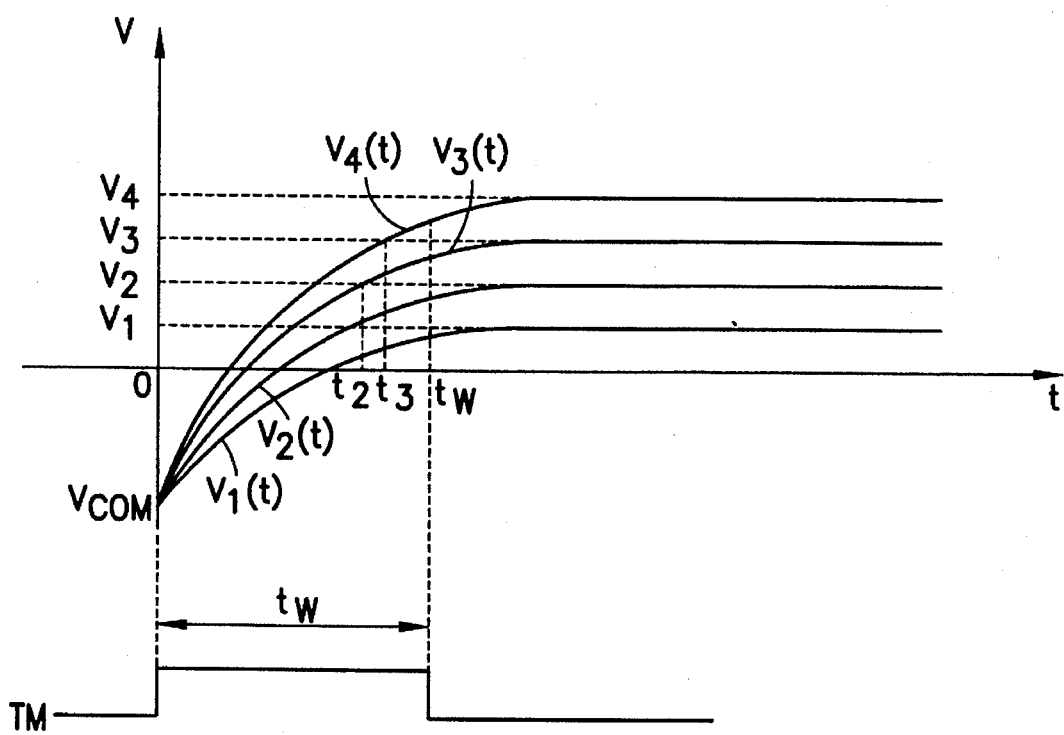
FIG. 18 illustrates the variation in the voltage applied to a pixel for various voltages output on a source line.

The voltage $v_c(t)$ comes closer to the voltage $V_i$ as shown in FIG. 17. Accordingly, before the voltage $v_c(t)$ comes sufficiently closer to the voltage $V_i$, at the time when the voltage $v_c(t)$ reaches a desired value, the time control pulse signal TM is dropped to Low to stop the output to the source line $O_n$. Thus, the voltage applied to a pixel can be set to an arbitrary value. FIG. 18 shows the curves of the voltage $v_c(t)$ applied to the pixel when the voltages $V_i$ supplied to the source line $O_n$ are $V_1$, $V_2$, $V_3$ and $V_4$, respectively. In the case of FIG. 18, it is assumed that the differences between the adjacent two levels of external voltages $V_1$, $V_2$, $V_3$ and $V_4$ are equal to each other. The respective voltages $V_i(t)$ are expressed as follows:

$$v_1(t)=V_{COM}+V_1 \cdot \{1-exp(-t/(C_s \cdot R_s))\}$$

$$v_2(t)=V_{COM}+V_2 \cdot \{1-exp(-t/(C_s \cdot R_s))\}$$

$$v_3(t)=V_{COM}+V_3 \cdot \{1-exp(-t/(C_s \cdot R_s))\}$$

$$v_4(t)=V_{COM}+V_4 \cdot \{1-exp(-t/(C_s \cdot R_s))\}$$

As seen from FIG. 18, the voltage $v_4(t)$ equals to the voltage $V_3$ at time $t_3$, and the voltage $v_3(t)$ equals to the voltage $V_2$ at time $t_2$. These times $t_2$ and $t_3$ are obtained by solving the following expressions, respectively:

$$V_2=V_{COM}+V_3 \cdot \{1-exp(-t_2/(C_s \cdot R_s))\}$$

$$V_3=V_{COM}+V_4 \cdot \{1-exp(-t_3/(C_s \cdot R_s))\}$$

When $V_4-V_3=V_3-V_2=V_2-V_1=\Delta V$, the voltages $V_2$, $V_3$ and $V_4$ are expressed as follows:

$$V_2=V_1 \Delta V$$

$$V_3=V_1+2\Delta V$$

$$V_4=V_1+3\Delta V$$

Therefore, the above expressions can be rewritten as follows:

$$V_1 \Delta V=V_{COM}+(V_1+2\Delta V)\{1-exp(-t_2/(C_s \cdot R_s))\}$$

$$V_1+2\Delta V=V_{COM}+(V_1+3\Delta V)\{1-exp(-t_3/(C_s \cdot R_s))\}$$

By solving these expressions, times $t_2$ and $t_3$ are obtained as follows:

$$t_2=C_s \cdot R_s \cdot \ln\{(V_1+2\Delta V)/(V_{COM}+\Delta V)\}$$

$$t_3=C_s \cdot R_s \cdot \ln\{(V_1+3\Delta V)/(V_{COM}+\Delta V)\}$$

The difference between times $t_2$ and $t_3$ is expressed as follows:

$$t_3-t_2=C_s \cdot R_s \cdot \ln\{V_1+3\Delta V)/(V_1+2\Delta V)\} \quad (2)$$

Since $V_1+3\Delta V>V_1+2/\Delta V$, the following condition is always satisfied:

$$t_3-t_2>0, \text{ that is, } t_3>t_2$$

In the same manner, the difference between times $t_1$ and $t_2$ is expressed as follows:

$$t_2-t_1=C_s \cdot R_s \cdot \ln\{V_1+2\Delta V)/(V_1+\Delta V)\}(3)$$

Since $t_2>t_1$, the following relationship is established:

$$t_3>t_2>t_1$$

Therefore, respective times t which satisfy the following conditions exist:

$$V_3<v_4(t)<V_4$$

$$V_2<v_3(t)<V_3$$

$$V_1<v_2(t)<V_2$$

$$V_1-\Delta V<v_2(t)<v_1$$

These respective times t satisfy the following inequalities, respectively:

$t_3 < t$ $t_2 < t$ $t_1 < t$ $0 < t$

That is, a point of time when the voltage applied to the pixel is an arbitrary voltage having a level between the respective two of the levels $V_1$, $V_2$, $V_3$ and $V_4$ uniquely exists.

In expressions (2) and (3), if $V_1 \gg \Delta V$, $t_3 = t_2 = t_1$. In this case, times t when the voltages $v_4(t)$, $v_3(t)$, $v_2(t)$ and $v_1(t)$ become the middle levels of the adjacent levels of the external voltages $V_1$, $V_2$, $V_3$ and $V_4$, i.e., $(V_4+V_3)/2$, $(V_3+V_2)/2$, $(V_2+V_1)/2$ and $V_1-\Delta V/2$, respectively, are approximately equal to each other.

The value of the voltage $V_1$ can be determined arbitrarily. Therefore, if the voltage $V_1$ is determined so as to satisfy the relationship of $V_1 \gg \Delta V$, the time periods $t_w$ for which the intermediate values $(V_4+V_3)/2$, $(V_3+V_2)/2$, $(V_2+V_1)/2$ and $V_1-\Delta V/2$ are supplied to the pixel can be respectively determined uniquely. Accordingly, by setting the width of the time control pulse signal TM shown in FIG. 18 to be the time period $t_w$, voltages with the intermediate values can be supplied to the pixel, only using a small number of external voltages. Generally, since $\Delta V$ becomes small with the increase in number of gray-scale levels to be displayed, the above-mentioned condition of $V_1 \gg \Delta V$ can be more easily satisfied as the number of the gray-scale levels increases.

Figure 19:
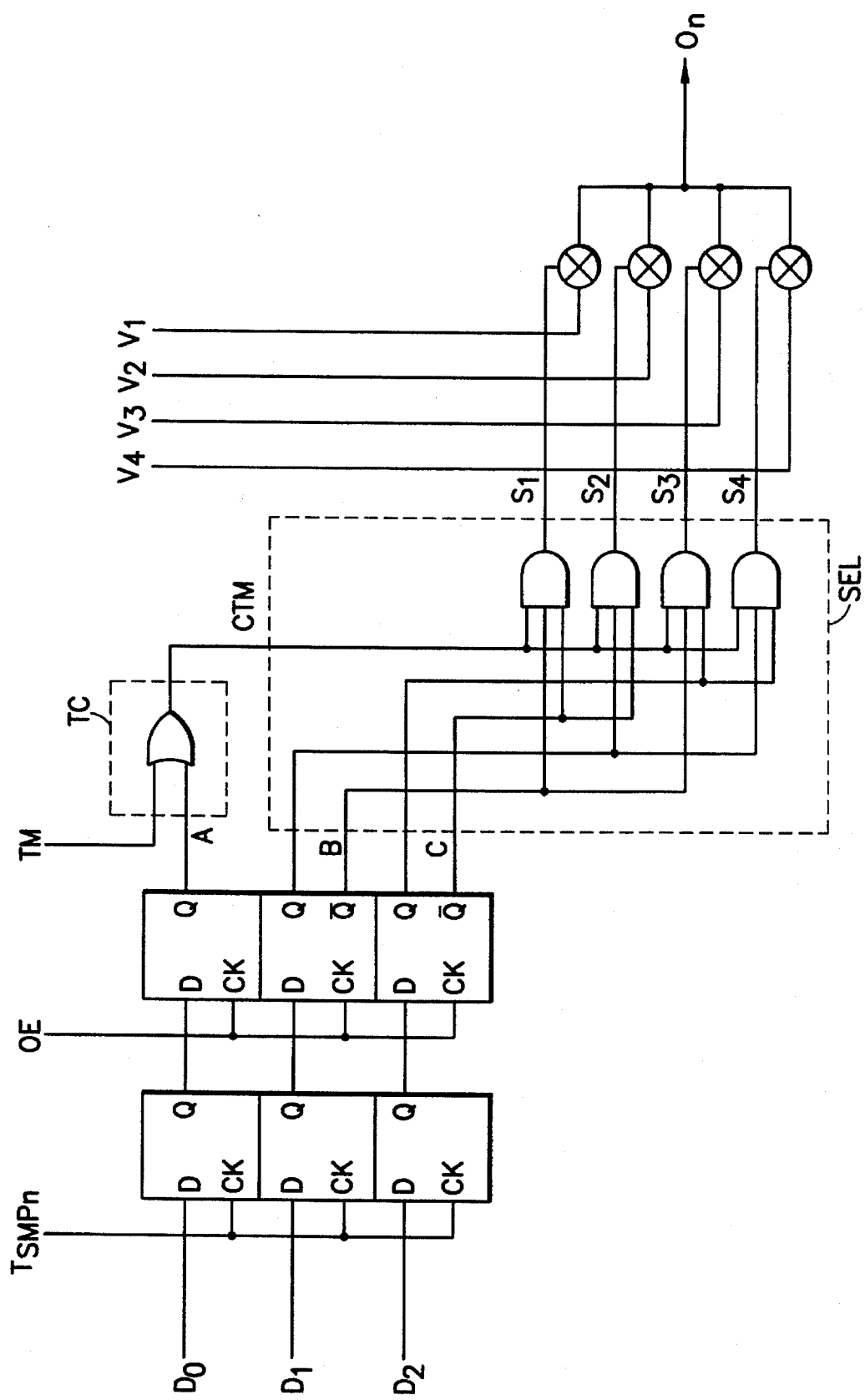
FIG. 19 is a circuit diagram illustrating in more detail the time control circuit and selection circuit of the embodiment of FIG. 13.
Figures 20, 21:
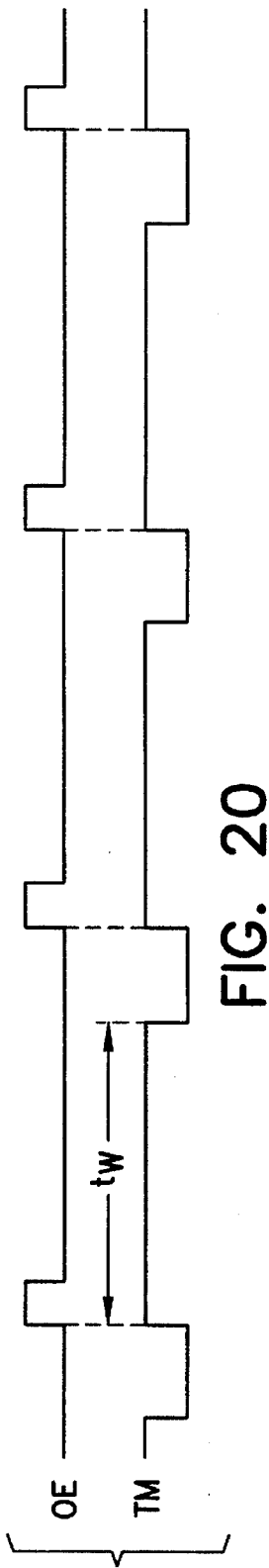
FIG. 20 illustrates inputs and outputs of the time control circuit of the embodiment of FIG. 13.
FIG. 21 illustrates the relationships between digital video signals and output voltages in the embodiment of FIG. 13.

FIG. 19 shows an example in which the time control circuit TC and the selection circuit MEL shown in FIG. 13 are realized by AND gates and OR gates. The time control circuit TC may be an OR gate. The selection circuit SEL can consist of four AND gates. The timing relationship between the output pulse OE and the time control pulse signal TM fed to the time control circuit TC is shown in FIG. 20. The time control pulse signal TM becomes High at the rising of the output pulse OE, so that the external voltage $V_i$ is begun to be supplied to the source line $O_n$. After the time period $t_w$ when the voltage of the pixel reaches the middle value, The time control pulse signal TM drops to Low. At this time, the next output pulse OE rises and the next output of voltage is started from the source driver to the source line. However, by the function of scanning electrodes (not shown), the pixel which is charged by $(V_i+V_{i+1})/2$ is disconnected from the source driver, so that the pixel keeps the condition charged by $(V_i+V_{i+1})/2$.

The relationship among the values of digital video signal data $D_0$, $D_1$ and $D_2$ and the voltage applied to the liquid crystal in the source driver of this embodiment is shown in FIG. 21. It will be understood that, by replacing the voltage levels realized in this embodiment with the following voltages, the source driver of this embodiment has the same function as that of the circuit required eight levels of external voltages as shown in FIG. 38:

$V_1 - \Delta V/2 \rightarrow V_0$ $V_1 \rightarrow V_1$ $(V_1+V_2)/2 \rightarrow V_2$ $V_2 \rightarrow V_3$ $(V_2+V_3)/2 \rightarrow V_4$ $V_3 \rightarrow V_5$ $(V_3+V_4)/2 \rightarrow V_6$ $V_4 \rightarrow V_7$ In this embodiment, the digital video signal data is 3 bits. Even if the video signal data is 4 bits, in the signal voltage output circuit according to the invention, the number of external voltage levels may be $2^3=8$, and only one time control pulse signal TM is required.

According to the embodiment, when signal voltages with different levels are applied to a pixel based on digital video signal data and a gray-scale display is performed, the voltages are not supplied in the first half of one output period, but one of the levels of the external voltages is supplied to a pixel only during a predetermined time period in the last half. By previously selecting the length of the time period based on the capacitance of the pixel, when one output period is terminated, the signal voltage can reach a desired voltage. Accordingly, voltages having the middle values between the respective adjacent external voltages can be supplied to the pixel.

Figure 22:
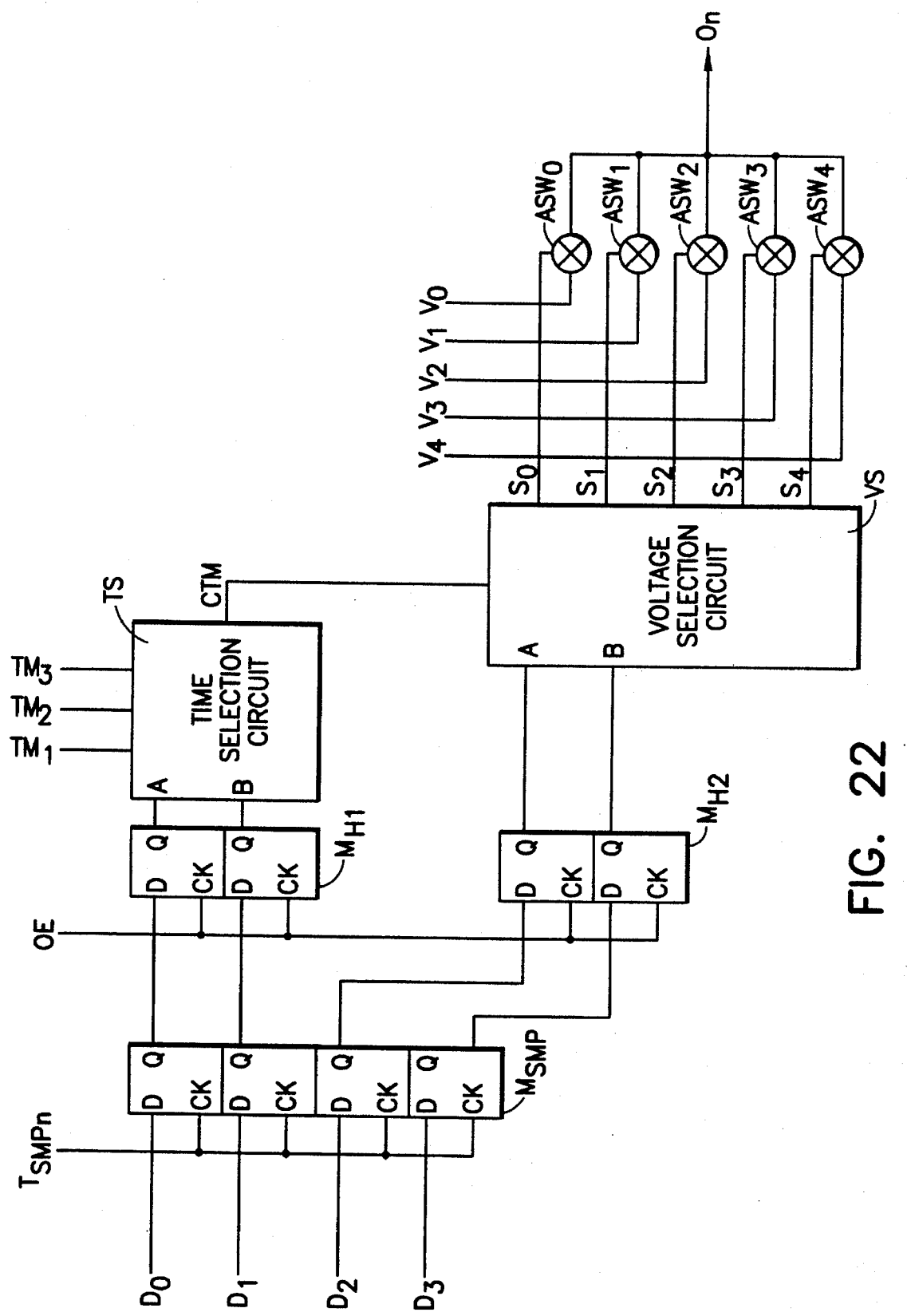
FIG. 22 is a block diagram illustrating a still further embodiment of the invention.

FIG. 22 shows a further embodiment. This embodiment comprises a signal voltage output circuit (a source driver) for the nth signal line (source line) $O_n$ of a drive circuit for an LCD apparatus to which digital video signal data of 4 bits is supplied. The circuit comprises a sampling memory $M_{SMP}$, two memories for holding outputs (holding memories) $M_{H1}$ and $M_{H2}$, a time selection circuit TS, a voltage selection circuit VS, and five analog switches $ASW_0$–$ASW_4$.

The sampling memory $M_{SMP}$ comprises four D-type flip-flops corresponding to the respective bits $D_0$, $D_1$, $D_2$ and $D_3$ of a digital video signal data. The sampling memory $M_{SMP}$ latches video signal data in accordance with the rising of a sampling pulse $T_{SMPn}$, and supplies them to the holding memories $M_{H1}$ and $M_{H2}$. Each of the two holding memories $M_{H1}$ and $M_{H2}$ includes two D-type flip-flops which correspond to the lower 2 memories $M_{H1}$ and $M_{H2}$ are latched at the rising of an bits and the upper 2 bits of the sampling memory $M_{SMP}$, respectively. The data to be supplied to the holding memories $M_{H1}$ and $M_{H2}$ are latched at the rising of an output pulse OE, and fed to the time selection circuit TS and the voltage selection circuit VS, respectively. At this time, the outputs of the holding memory $M_{H1}$ corresponding to the lower 2 bits $D_0$ and $D_1$ of the digital video signal data are fed to the time selection circuit TS through the input terminals A and B. The outputs of the holding memory $M_{H2}$ corresponding to the upper 2 bits $D_2$ and $D_3$ are fed to the voltage selection circuit VS through the input terminals A and B.

In addition to the 2-bit data (the lower 2 bits $D_0$ and $D_1$ of the video signal data) from the holding memory $M_{H1}$, the time selection circuit TS receives three external pulse signals (time division pulse signals) $TM_1$, $TM_2$ and $TM_3$. The three time division pulse signals $TM_1$, $TM_2$ and $TM_3$ are different in pulse width from each other. An output CTM from the time selection circuit TS is fed to the voltage selection circuit VS in conjunction with the upper 2 bits $D_2$ and $D_3$ of the video signal data. Based on these inputs, the voltage selection circuit VS makes one of five outputs $S_0$–$S_4$ High or 1 in accordance with a logic described below. Thus, the corresponding one of the analog switches $ASW_0$–$ASW_4$ is conductive, and one of the external voltages $V_0$–$V_4$ is supplied to the source line $O_n$ ($V_0 < V_1 < V_2 < V_3 < V_4$, and the potential differences between the respective adjacent levels are equal).

The relationship among the input data ($D_0$, $D_1$) at the inputs A and B and the output CTM of the time selection circuit TS is shown in the logic table of FIG. 23. When the value of the input data is 0 (i.e., $(D_0, D_1)=(0, 0)$), the output CTM is always 0. When the value of the input data is 1, 2 or 3 (i.e., $(D_0, D_1)=(0, 1), (1, 0)$ or $(1, 1)$), the output CTM is 0 or 1 in synchronization with the respective time division pulse signals $TM_1$, $TM_2$ and $TM_3$.

The relationship among the inputs A, B and CTM and the output of the voltage selection circuit VS is shown in the logic table of FIG. 24. When the upper 2 bits $(D_2, D_3)$ of the video signal data are $(0, 0)$ and the input CTM is 0, the output $S_0$ becomes 1. When $(D_2, D_3)=(0, 0)$ and CTM=1, the output $S_1$ becomes 1. For $(D_2, D_3)$ having another value ($(0, 1), (1, 0)$ or $(1, 1)$), in the same manner, the output $S_i$ ($i=1, 2, 3$) becomes 1 when CTM is 0, and the output $S_{i+1}$ becomes 1 when CTM is 1. Therefore, for one unit of video signal data, the voltage supplied to the corresponding source line $O_n$ from the source driver of FIG. 22 changes from the lower voltage level $V_i$ to the higher voltage level $V_{i+1}$, in accordance with the change (from 0 to 1) of the output CTM from the time selection circuit TS. The value of the output CTM of the time selection circuit TS changes in accordance with the time division pulse signal $TM_k$ (k=1, 2, 3) when the lower 2 bits $(D_0, D_1)$ of the video signal data are not $(0, 0)$. Accordingly, for example as shown in the timing chart of FIG. 25, the voltage $V_0$ is supplied during the time period $t_a$ beginning from the rising of the output pulse OE, and thereafter the voltage $V_1$ is supplied during the time period $t_b$. The sum of the time periods $t_a$ and $t_b$ equals the period of the output pulse OE which is constant. However, as described above, the time division pulse signals $TM_k$ are different from each other in the ratio of the time periods $t_a$ and $t_b$.

Figure 25:
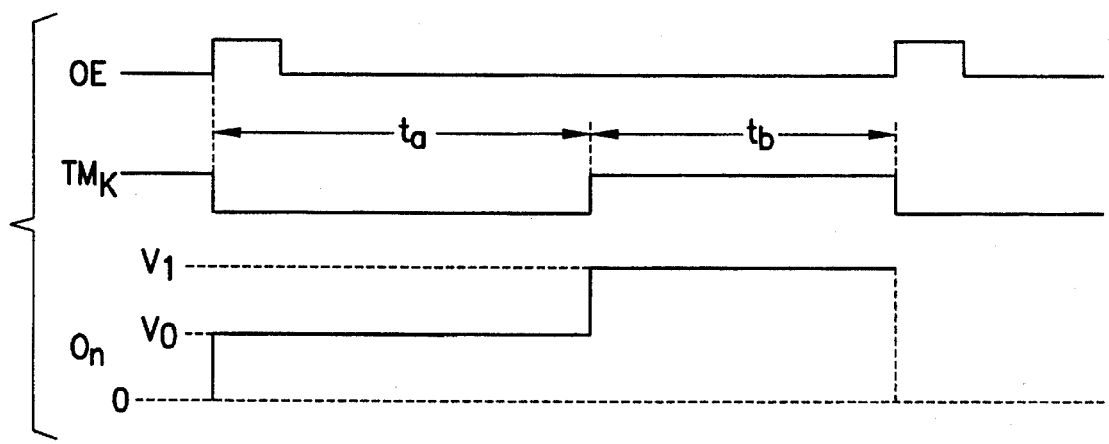
FIG. 25 is a timing chart illustrating the operation of the embodiment of FIG. 22.
Figure 26:
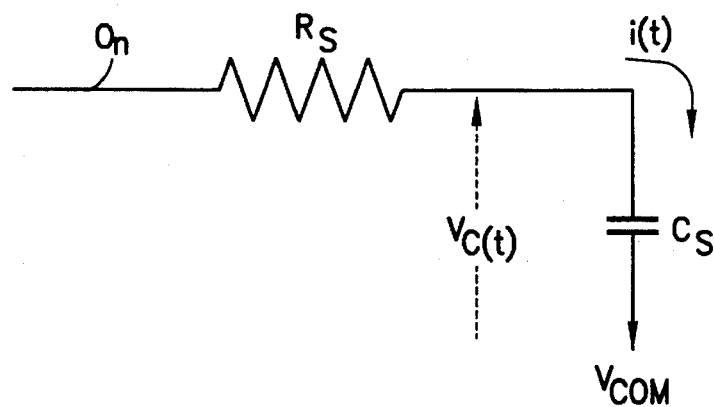
FIG. 26 illustrates an equivalent circuit of one source line.

FIG. 26 shows an equivalent circuit of the load for the source line $O_n$. The resistance of the source line $O_n$ is represented by $R_s$, and the capacitance of the liquid crystal pixel connected to the source line $O_n$ is represented by $C_s$. A common voltage applied to the opposite electrode of the liquid crystal display panel is indicated by $V_{COM}$. In the case of FIG. 25, the voltage v(t) supplied to the source line $O_n$ is changed as follows:

$$v(t)=V_0 \ (0<t<t_a)$$

and $$v(t)=V_1 \ (t_a \leq t \leq t_a+t_b)$$

During the time period of $0<t<t_a$, the voltage $v_0$ is supplied to the source line $O_n$. Accordingly, the voltage $v_c(t)$ across the capacitance $C_s$ of the pixel which is a load for the source line $O_n$ can be obtained from the following simultaneous equations:

$$V_0=R_s \cdot i(t)+(1/C_s)\int i(t)dt$$

$$v_c(t)=(1/C_s)\int i(t)dt+V_{COM}$$

where i(t) represents a current flowing through the source line $O_n$. By solving the simultaneous equations, the voltage $v_c(t)$ is obtained as follows:

$$v_c(t)=V_{COM}+V_0 \cdot \{1-exp(-t/(C_s \cdot R_s))\}$$

Figure 27:
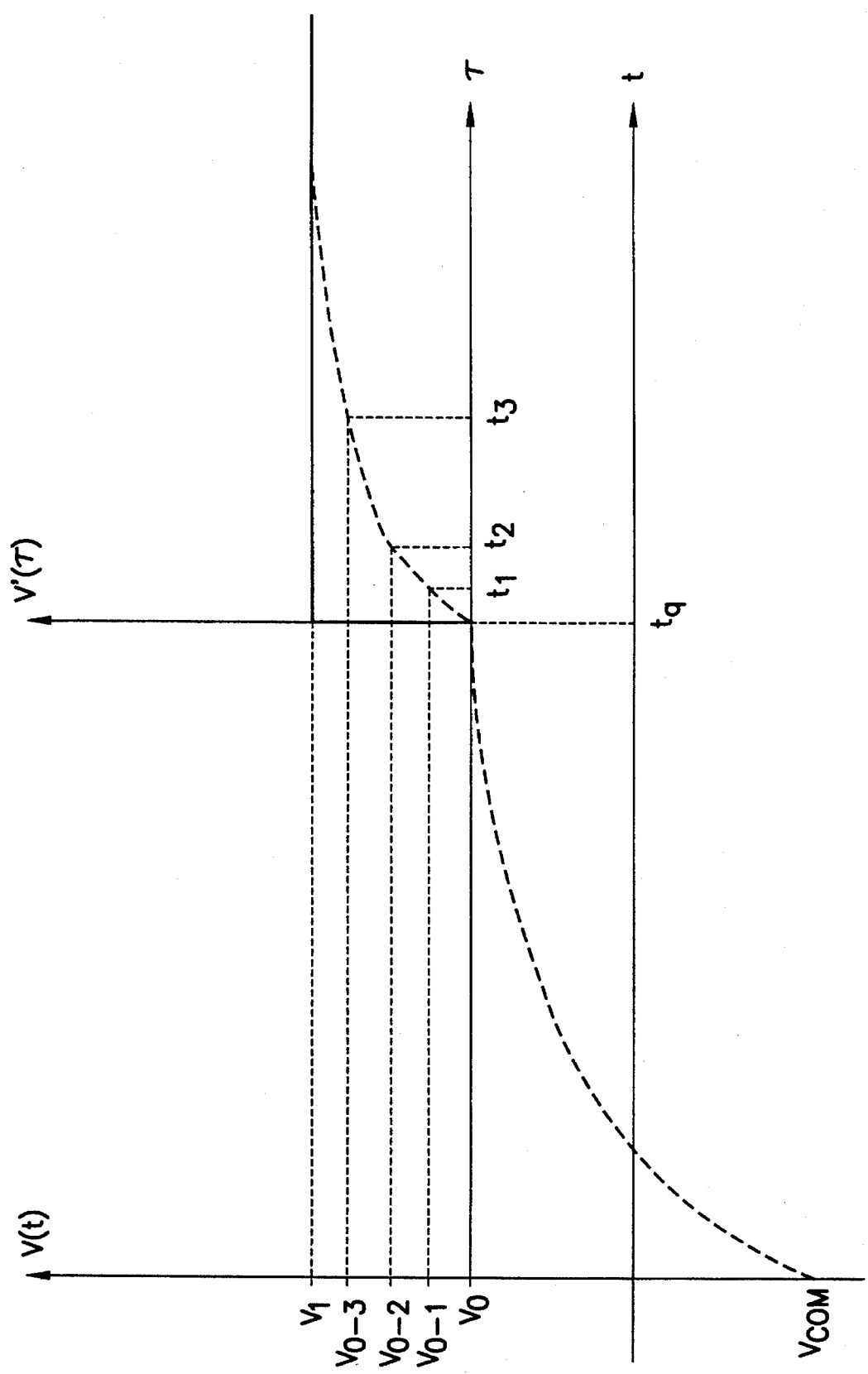
FIG. 27 illustrates the relationship between the variation in the voltage level output on a source line and the voltage applied to a pixel.

The voltage $v_c(t)$ comes closer to the voltage $V_0$ as shown by a broken curve in FIG. 27. In view of this rising characteristic of the voltage, when designing a liquid crystal panel, the values of the capacitance $C_s$ and the resistance $R_s$ of a liquid crystal are determined so that the voltage $v_c(t)$ comes sufficiently closer to the voltage $V_0$ in a shorter period of time than the period of the output pulse OE. In other words, the values of capacitance $C_s$ and resistance $R_s$ are appropriately determined, whereby the voltage can come sufficiently closer to the voltage $V_0$ at the time $t_q$.

The change in the voltage $v_c(t)$ after the time $t_q$ can be obtained from the following simultaneous equations:

$$V_1-V_0=R_s \cdot i(\tau)+(1/C_s)\int i(\tau)d\tau$$

$$v_c'(\tau)=(1/C_s)\int i(\tau)d\tau$$

In these equations, the coordinate transformation is performed as follows:

$$t=\tau+t_q$$

$$v=v'+V_0$$

The solution of the above simultaneous equations is effected as follows:

$$v_c(\tau)=(V_1-V_0) \cdot \{1-exp(-\tau/(C_s \cdot R_s))\}$$

When the difference between the voltages $V_0$ and $V_1$ are divided into four equal parts, the obtained voltages are represented by $V_{0-1}$, $V_{0-2}$ and $V_{0-3}$. The time periods $t_1$, $t_2$ and $t_3$ (from time $t_q$) required for the voltage $v_c(\tau)$ to reach the voltages $V_{0-1}$, $V_{0-2}$ and $V_{0-3}$ are respectively obtained by the following equations:

$$(V_1-V_0)/4=(V_1-V_0) \cdot \{1-exp(-\tau/(C_s \cdot R_s))\}$$

$$(V_1-V_0)/2=(V_1-V_0) \cdot \{1-exp(-\tau/(C_s \cdot R_s))\}$$

$$3(V_1-V_0)/4=(V_1-V_0) \cdot \{1-exp(-\tau/(C_s \cdot R_s))\}$$

The solutions are effected as follows:

$$t_1=0.288 \ C_s \cdot R_s$$

$$t_2=0.693 \ C_s \cdot R_s$$

$$t_3=1.39 \ C_s \cdot R_s$$

As is apparent from these equations, the time periods $t_1$, $t_2$ and $t_3$ are independent of the external voltages $V_0$ and $V_1$. That is, the time periods $t_1$, $t_2$ and $t_3$ are always constant even when any two adjacent voltage levels are selected from the external voltage levels $V_0$-$V_4$ by the voltage selection circuit VS. Therefore, when the time period $t_b$ for which the time division pulse signals $TM_1$, $TM_2$ and $TM_3$ to be supplied to the time selection circuit TS are High is set to the time period $t_1$, $t_2$ or $t_3$ obtained from the above equations, the voltage levels $V_{0-1}$, $V_{0-2}$ and $V_{0-3}$ (which are obtained by dividing the difference between the voltage levels $V_0$-$V_1$) can be arbitrarily applied to the liquid crystal. In the same manner, voltage levels $V_{1-1}$, $V_{1-2}$ and $V_{1-3}$ which are obtained in such a manner that the difference between the voltages $V_1$ and $V_2$ is divided into four equal parts, and voltage levels which are obtained in such a manner that the difference between the voltages $V_2$ and $V_3$ is divided into four equal parts can be produced by these time division pulse signals $TM_1$, $TM_2$ and $TM_3$.

Figure 37:
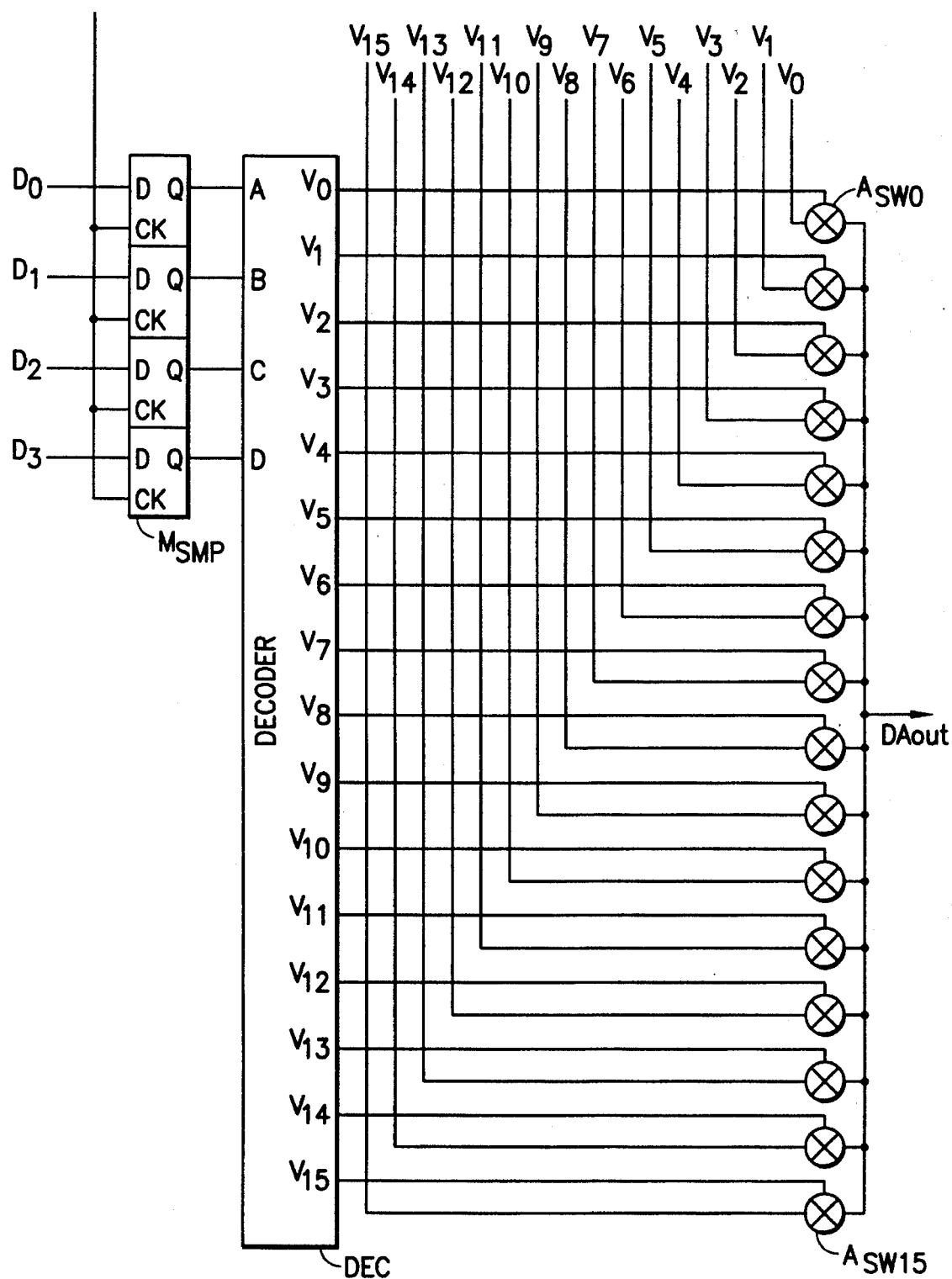
FIG. 37 illustrates a portion of a drive circuit for one source line which receives 4-bit digital video signals.

FIG. 28 shows the relationship among the values of the digital video signal data $D_0$, $D_1$, $D_2$ and $D_3$ and the voltage applied to the liquid crystal in the source driver of this embodiment which operates as described above. When the lower 2 bits ($D_0$, $D_1$) of video signal data are (0, 0), the output of the time selection circuit TS is always 0, irrespective of the change in the time division pulse signal $TM_k$ (k=1, 2, 3), so that the voltage with external voltage level $V_0$, $V_1$, $V_2$ or $V_3$ is supplied to the source line $O_n$. When the lower 2 bits ($D_0$, $D_1$) have values other than (0, 0), the output of the time selection circuit TS changes from 0 to 1 with the change of the time division pulse signal $TM_k$ in one period of the output pulse OE as shown in FIG. 25. When the lower 2 bits ($D_0$, $D_1$) are (1, 0), the time division pulse signal $TM_1$ is selected in the time selection circuit TS. Therefore, the time period $t_b$ for which the higher voltage is output is the shortest time period $t_1$ (conversely, the time period $t_a$ for which the lower voltage is output is longest), and the voltages applied to the pixel have the levels $V_{0-1}$, $V_{1-1}$, $V_{2-1}$, and $V_{3-1}$ each of which is the lowest one among the three voltage levels obtained by dividing the difference between the adjacent levels into four equal parts. When the lower 2 bits ($D_0$, $D_1$) are (0, 1), the time division pulse signal $TM_2$ is selected in the time selection circuit TS. Therefore, the time period $t_b$ is the middle time period $t_2$, and the voltages applied to the pixel have the levels $V_{0-2}$, $V_{1-2}$, $V_{2-2}$ and $V_{3-2}$ which are the middle levels among the adjacent levels. When the lower 2 bits ($D_0$, $D_1$) are (1, 1), the time division pulse signal $TM_3$ is selected in the time selection circuit TS. Therefore, the time period $t_b$ is the longest time period $t_3$, and the voltages applied to the pixel have the levels $V_{0-3}$, $V_{1-3}$, $V_{2-3}$, and $V_{3-3}$ each of which is the highest one among the three voltage levels obtained by dividing the difference between the adjacent levels into four equal parts. As described above, in this embodiment, by only using five levels of external voltages $V_0$, $V_1$, $V_2$, $V_3$, and $V_4$, 16 voltage levels can be applied to the pixels. As shown in FIG. 37, in a conventional digital source driver, in order to apply 16 voltage levels to pixels, the same number of external voltage levels (i.e., 16 levels) are required. In the drive circuit according to the invention, the number of external voltage sources can be greatly reduced, whereby the size and the production cost of the circuit can be reduced.

Figure 29:
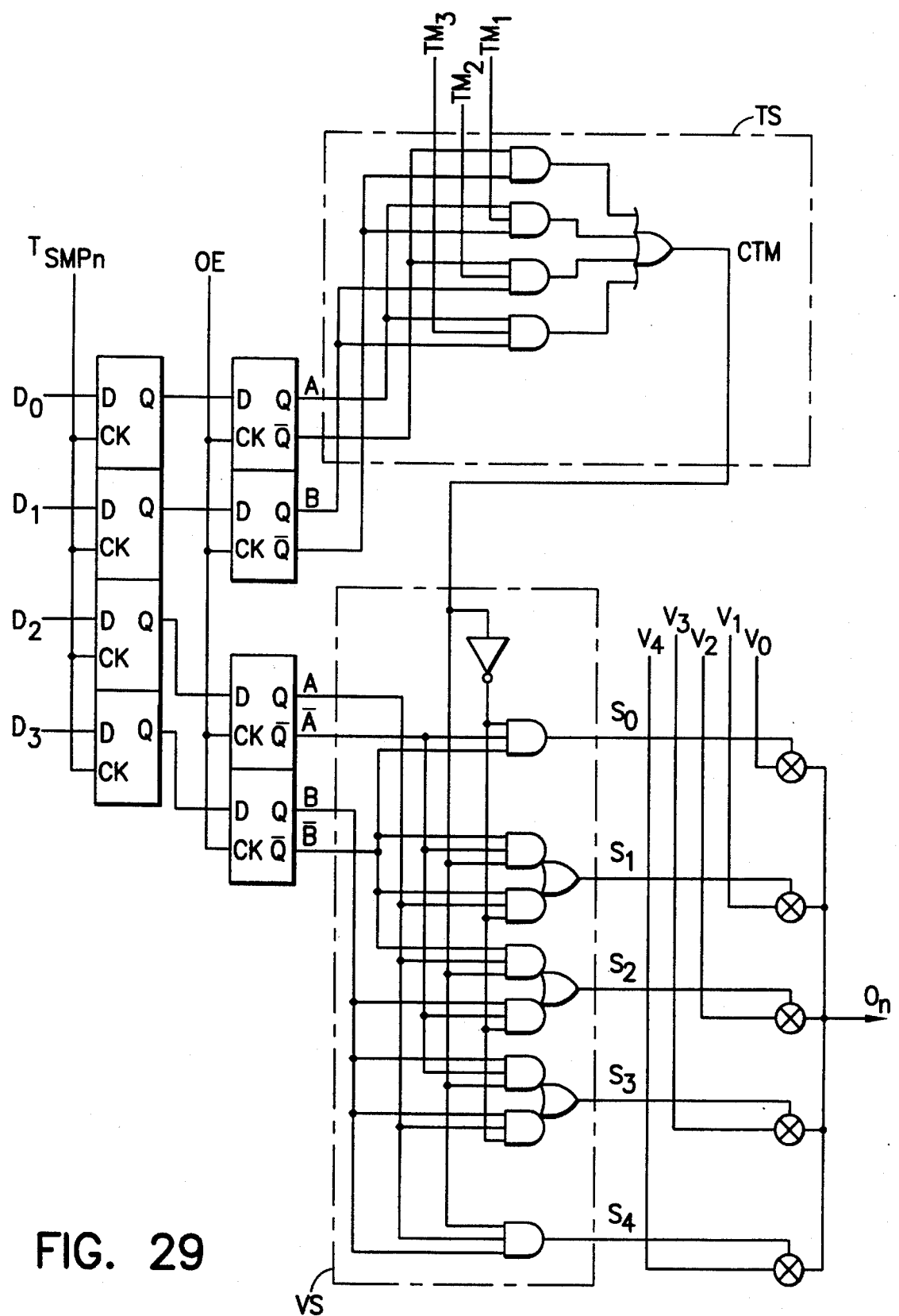
FIG. 29 is a circuit diagram illustrating in more detail the time selection circuit and voltage selection circuit of the embodiment of FIG. 22.
Figure 30:
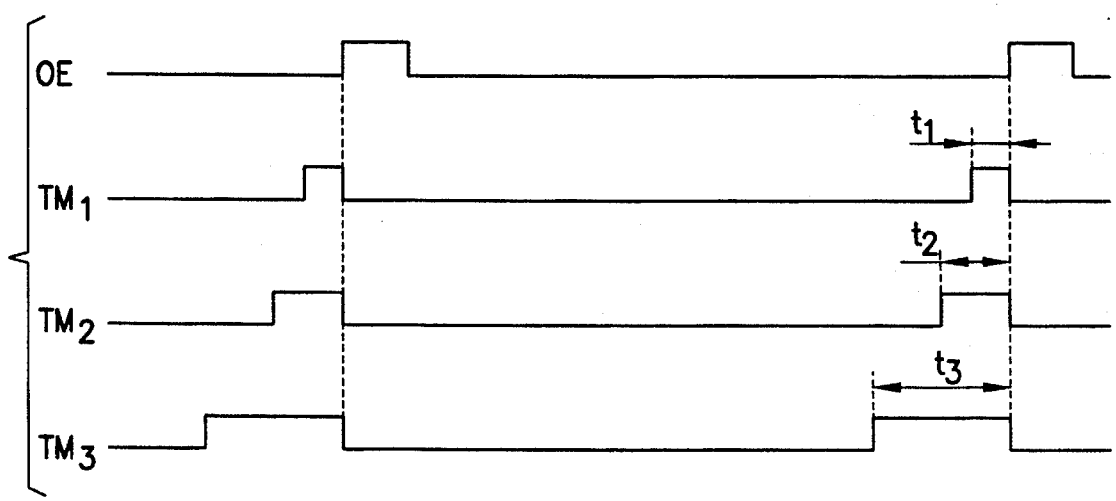
FIG. 30 is a timing chart illustrating inputs of the time selection circuit.
Figure 31:
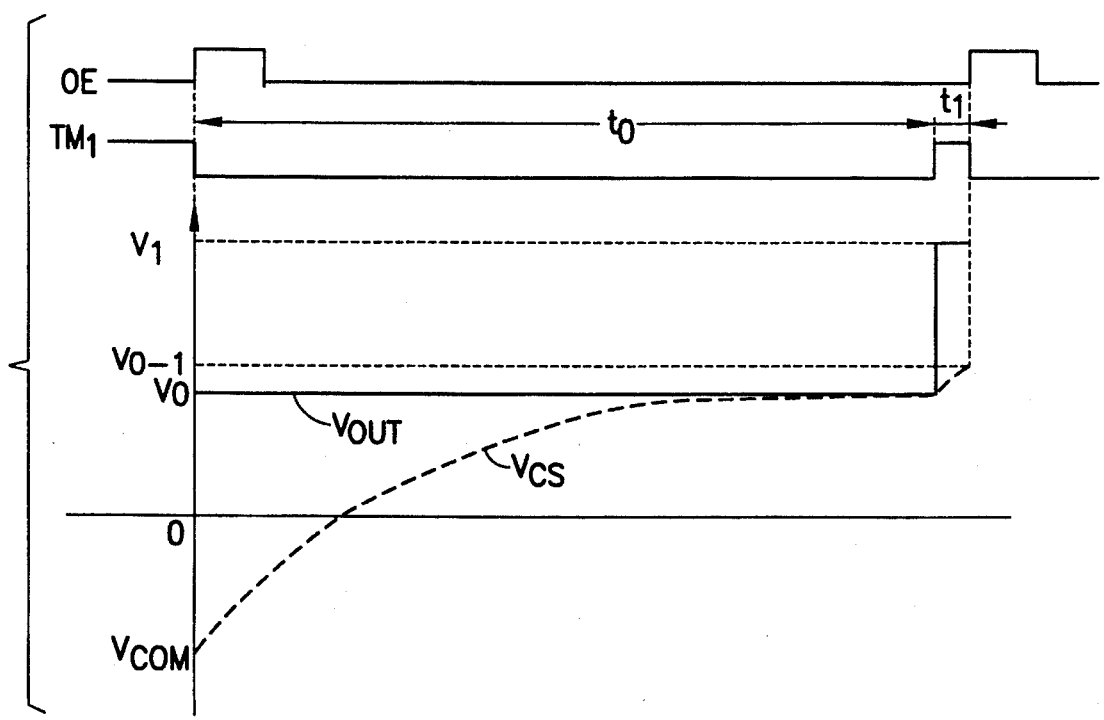
FIG. 31 is a timing chart illustrating the relationship between the inputs of the time selection circuit and voltages applied to a pixel.
Figure 32:
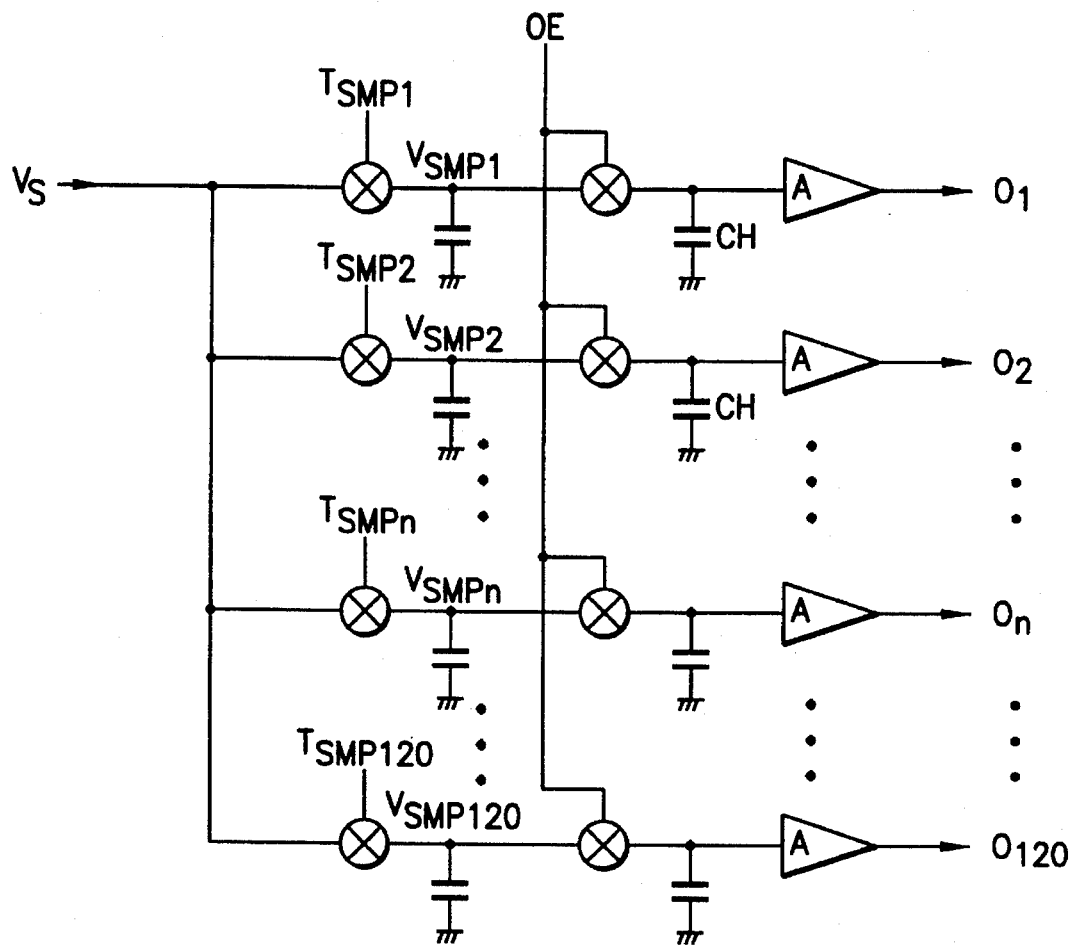
FIG. 32 is a circuit diagram of a drive circuit for analog video signals.
Figure 33:
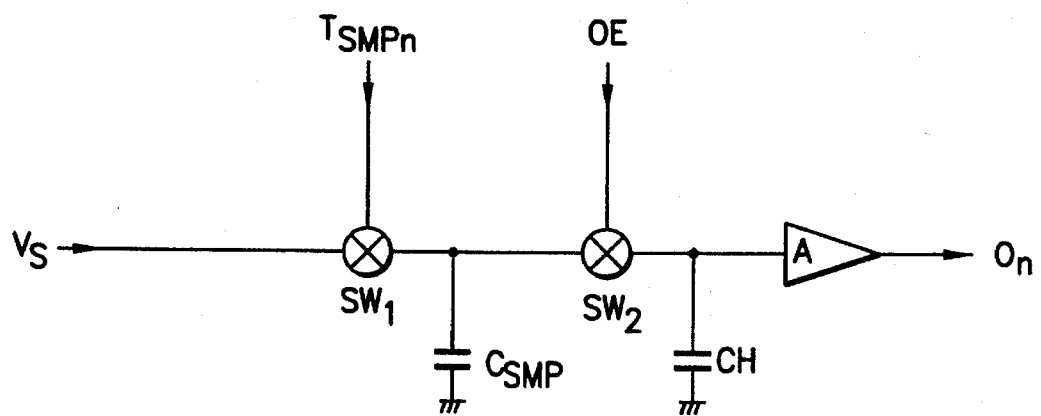
FIG. 33 illustrates a portion of the drive circuit of FIG. 32 for one source line.
Figure 34:
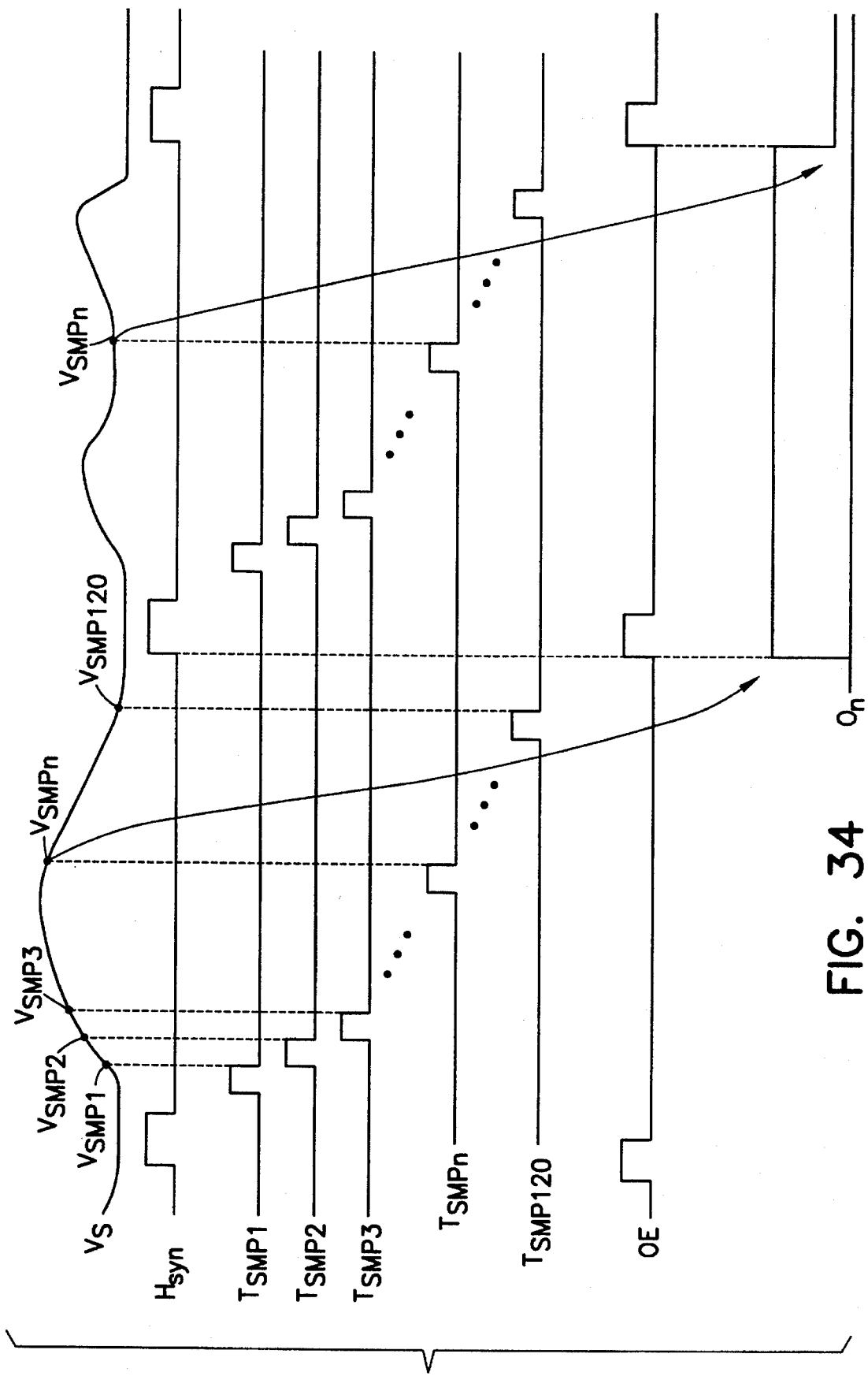
FIG. 34 illustrates the operation of the drive circuit of FIG. 32.

FIG. 29 shows an example in which the time selection circuit TS and the voltage selection circuit VS in FIG. 22 consists of logic circuits comprising AND gates, OR gates and an inverter. The time selection circuit TS consists of AND gates and OR gates arranged in accordance with the logic table of FIG. 23. The voltage selection circuit VS consists of AND gates, OR gates and an inverter according to the logic table of FIG. 24. An example of a specific relationship among the output pulse OE and the time division pulse signals $TM_1$, $TM_2$, and $TM_3$ to be supplied to the time selection circuit TS is shown in the timing chart of FIG. 30. As shown in FIG. 30, falling edges of the time division pulse signals $TM_1$, $TM_2$, and $TM_3$ (High) conform with the rising edge of the output pulse OE. FIG. 31 shows the relationship among the output pulse OE, the time division pulse signal $TM_1$, the output $V_{OUT}$ to the source line $O_n$ and the voltage $V_{cs}$ applied to the pixel, in the source driver of FIG. 29 (or FIG. 22) to which video signal data ($D_0$, $D_1$, $D_2$, $D_3$) of (0, 0, 0, 1) are supplied. Since the duration $t_0$ of the voltage $V_0$ supplied to the source line $O_n$ for the first time is sufficiently long, the voltage of the pixel comes sufficiently closer to the voltage $V_0$ during this duration. After the time period $t_0$, the voltage $V_1$ of next higher level is started to be supplied to the source line $O_n$. As calculated by the above equations, the voltage $V_{cs}$ applied to the pixel becomes $V_{0-1}$ (=$V_0$+($V_1$−$V_0$)/4) after the time period $t_1$. When the voltage of the pixel reaches the voltage $V_{0-1}$, the next output pulse OE rises and the next output of voltage from the source driver to the source line is started. At this time, by the function of scanning electrodes (not shown), the pixel which has been charged by the voltage $V_{0-1}$ is disconnected from the source driver, so that the pixel keeps the condition of being charged by the voltage $V_{0-1}$.

In the above-described embodiment, the digital video signal data is 4 bits. For example, when the video signal data is 6 bits to comply with an increased gray-scale, the required number of levels of external voltage sources is $2^6$=64 in the conventional digital drive circuit shown in FIG. 37. By contrast, in the drive circuit according to the invention, for example, 4 bits are assigned to the voltage selection circuit VS and 2 bits are to the time selection circuit TS. Therefore, by providing external voltage sources with $2^4$+1=17 levels and three time division pulse signals $TM_1$–$TM_3$, a display with 64 gray-scale levels can be attained.

According to the invention, when a gray-scale display is performed by supplying signal voltages with different levels based on digital video signal data, one output period of the signal voltages is divided into two periods. In the first and last half of the periods, the external voltages with different levels are supplied to a pixel. By appropriately determining the ratio of time periods for supplying the voltage according to the capacitance of the pixel, a voltage with an arbitrary level between adjacent external voltage levels can be supplied to the pixel. Accordingly, it is unnecessary to prepare external voltages the number of which is the same as that of a predetermined gray-scale levels. Therefore, the external voltage supplying circuit can be made smaller and the number of terminals of the drive circuit for a display circuit can be reduced.

Furthermore, since the steps between adjacent voltages applied to the pixel can be more minute than the steps between adjacent levels of external voltage sources, minute gray-scale display can be attained even when voltages with minute differences are difficult to produce in an external voltage producing circuit.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A drive circuit for a display apparatus into which a digital video signal is input and in which a plurality of parallel signal electrodes are provided, comprising:

voltage supplying means for supplying a plurality of signal voltages, the levels of said signal voltages being different from each other;

time control means for receiving one portion of said digital video signal, and for producing a time division signal indicative of two or more divided periods of one signal output period in accordance with said one portion of said digital video signal; and voltage selecting means, connected to said voltage supplying means and said time control means, for receiving said digital video signal, for, in accordance with said time division signal and the remaining portion of said digital video signal, outputting one of said signal voltages in one of said divided periods, and for outputting another one of said signal voltages in another of said divided periods.

2. A drive circuit according to claim 1, wherein said voltage selecting means is provided for each of said signal electrodes.

3. A drive circuit according to claim 1, wherein said voltage selecting means comprises: a plurality of switch means, the number of said switch means being equal to the number of said signal voltages; and selection means for producing selection signals, said selection signals respectively controlling said switch means.

4. A drive circuit for a display apparatus in which a drive voltage is applied to a display drive line in accordance with a digital video signal, said drive circuit comprising:

time control means for receiving a portion of said digital video signal, and for producing a time division signal defining at least a first period and a second period included in a signal output period in accordance with said portion of said digital video signal, said display drive line being connected to a pixel during said signal output period;

voltage selecting means, connected to said time control means, for receiving a remaining portion of said digital video signal and said time division signal, and selectively outputting, to said display drive line, one of a plurality of signal voltages during said first period of said signal output period and another of said plurality of signal voltages during said second period of said signal output period, in accordance with said remaining portion of said digital video signal and said time division signal, said plurality of signal voltages being different from each other, wherein the length of said first period and the length of said second period are determined by said time control means in accordance with said portion of said digital video signal.

5. A drive circuit according to claim 4, wherein said voltage selecting means further outputs, to said display drive line, one of said plurality of signal voltages during both of said first and second periods of said signal output period.

6. A drive circuit according to claim 5, wherein said voltage selecting means is provided for said display drive line of said display apparatus.

7. A drive circuit according to claim 6, wherein said voltage selecting means comprises:

a plurality of switch means, the number of said plurality of switch means being equal to the number of said plurality of signal voltages; and selection means for producing selection signals which respectively control said plurality of switch means.

8. A drive circuit according to claim 7, wherein said time control means receives a control signal and selectively outputs either said control signal or a constant value to said voltage selecting means in accordance with said portion of said digital video signal.

* * * * *